United States Patent
Kondo et al.

(10) Patent No.: US 11,777,343 B2
(45) Date of Patent: Oct. 3, 2023

(54) POWER TRANSMISSION DEVICE AND ELECTRIC POWER TRANSMISSION SYSTEM

(71) Applicant: TDK CORPORATION, Tokyo (JP)

(72) Inventors: Kazuki Kondo, Tokyo (JP); Akira Gotani, Tokyo (JP); Masahide Ohnishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 91 days.

(21) Appl. No.: 17/620,377

(22) PCT Filed: Jan. 19, 2021

(86) PCT No.: PCT/JP2021/001718
§ 371 (c)(1),
(2) Date: Dec. 17, 2021

(87) PCT Pub. No.: WO2022/157835
PCT Pub. Date: Jul. 28, 2022

(65) Prior Publication Data
US 2023/0155421 A1    May 18, 2023

(51) Int. Cl.
*H02J 50/60* (2016.01)
*H02J 50/10* (2016.01)
*B60L 53/124* (2019.01)

(52) U.S. Cl.
CPC ............ *H02J 50/60* (2016.02); *B60L 53/124* (2019.02); *H02J 50/10* (2016.02)

(58) Field of Classification Search
CPC ......... B60L 53/124; H02J 50/10; H02J 50/12; H02J 50/60
See application file for complete search history.

(56) References Cited

U.S. PATENT DOCUMENTS

| 10,186,906 | B2 | 1/2019 | Tsukamoto | |
| 2010/0328044 | A1* | 12/2010 | Waffenschmidt | H02J 50/90 307/104 |
| 2012/0326524 | A1 | 12/2012 | Matsumoto et al. | |
| 2014/0125287 | A1* | 5/2014 | Nakano | H02J 50/80 307/104 |
| 2018/0375387 | A1* | 12/2018 | Oshima | G01R 31/52 |
| 2020/0012007 | A1* | 1/2020 | Oshima | H02J 50/80 |

FOREIGN PATENT DOCUMENTS

| JP | 2011-229265 A | 11/2011 |
| JP | 2018-050468 A | 3/2018 |
| JP | 6671920 B2 | 3/2020 |

* cited by examiner

*Primary Examiner* — Levi Gannon
(74) *Attorney, Agent, or Firm* — Oliff PLC

(57) ABSTRACT

A power transmission device wirelessly transmits electric power to a power reception device. A power transmission coil is configured by winding a conductive wire. A foreign object detection device detects a foreign object. Sensor coils are placed to cover the power transmission coil. A detector executes determination processing of determining existence of the foreign object on each of the sensor coils, based on a comparison result between a comparison target value based on output voltage output from one sensor coil of the sensor coils and a threshold value set to the one sensor coil. The detector executes threshold value change processing of changing the threshold value set to the one sensor coil on each of the sensor coils, based on induced voltage induced in the one sensor coil by magnetic flux generated by the power transmission coil.

11 Claims, 14 Drawing Sheets

FIG.8
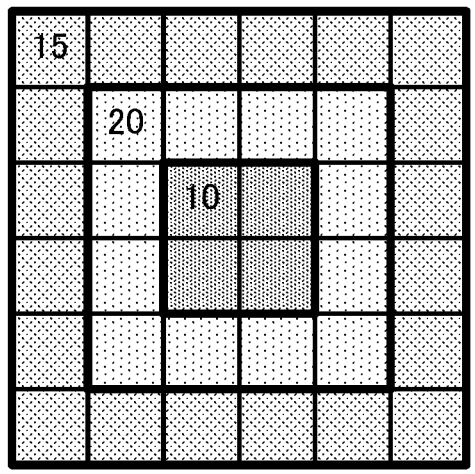
 SENSOR COIL
FIG.9
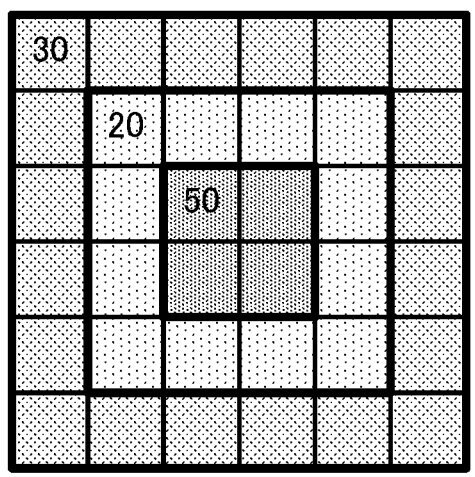
 SENSOR COIL

FREQUENCY OF DETERMINATION PROCESSING (NUMBER OF TIMES)

ORDINAL NUMBER FOR DETERMINATION PROCESSING

POWER TRANSMISSION DEVICE AND ELECTRIC POWER TRANSMISSION SYSTEM

TECHNICAL FIELD

The present disclosure relates to a power transmission device and an electric power transmission system.

BACKGROUND ART

A wireless electric power transmission technology for wirelessly transmitting electric power has been receiving attention. The wireless electric power transmission technology can wirelessly transmit electric power from a power transmission device to a power reception device, and therefore application of the technology to various products such as transportation equipment such as an electric train and an electric vehicle, a home appliance, wireless communication equipment, and a toy is expected. A power transmission coil and a power reception coil coupled to each other by magnetic flux are used for transmission of electric power in the wireless electric power transmission technology.

Existence of a foreign object such as a metal piece near the power transmission coil and the power reception coil may cause various problems. For example, such a foreign object may adversely affect electric power transmission from the power transmission coil to the power reception coil or may generate heat by eddy current. Accordingly, a technology for suitably detecting a foreign object existing near the power transmission coil and the power reception coil is desired.

For example, Patent Literature 1 discloses a technology for determining, in a power transmission device wirelessly transmitting electric power to a power reception device, a threshold value for foreign object detection in accordance with information defining electric power that can be transmitted by the power transmission device and information defining electric power that can be received by the power reception device.

CITATION LIST

Patent Literature

Patent Literature 1: Japanese Patent No. 6671920

SUMMARY OF INVENTION

Technical Problem

In the wireless electric power transmission as described above, density of magnetic flux generated by the power transmission coil is not uniform, and unevenness occurs depending on the location. Therefore, when a uniform reference is set to sensors as a reference for foreign object detection in a case of detecting a foreign object by placing the sensors side by side, a foreign object may not be precisely detected depending on the magnetic flux received by each sensor.

The present disclosure has been made in view of the problem described above, and an objective of the present disclosure is to enhance detection precision of a foreign object in wireless electric power transmission.

Solution to Problem

In order to solve the aforementioned problem, a power transmission device according to an embodiment of the present disclosure is a power transmission device wirelessly transmitting electric power to a power reception device and includes:

a power transmission coil configured by winding a conductive wire; and a foreign object detection device detecting a foreign object, wherein the foreign object detection device includes:

sensor coils placed to cover the power transmission coil; and a detector executing determination processing of determining existence of the foreign object on each of the sensor coils, based on a comparison result between a comparison target value based on output voltage output from one sensor coil of the sensor coils and a threshold value set to the one sensor coil, and the detector executes threshold value change processing of changing the threshold value set to the one sensor coil on each of the sensor coils, based on induced voltage induced in the one sensor coil by magnetic flux generated by the power transmission coil.

Advantageous Effects of Invention

The power transmission device with the aforementioned configuration can enhance detection precision of a foreign object in wireless electric power transmission.

BRIEF DESCRIPTION OF DRAWINGS

FIG. 8 is a diagram illustrating an example of voltage induced in sensor coils when electric power is transmitted by a power transmission device, according to Embodiment 1;

FIG. 9 is a diagram illustrating an example of a threshold value set to each of sensor coils, according to Embodiment 1;

DESCRIPTION OF EMBODIMENTS

Embodiments of the present disclosure will be described below with reference to drawings. Note that the same or equivalent parts are given the same sign in each diagram.

Embodiment 1

An electric power transmission system according to Embodiment 1 is a system wirelessly transmitting electric power to a movable body and charging a secondary battery included in the movable body. Examples of the movable body include an electric vehicle (EV), mobile equipment such as a smartphone, and industrial equipment. An example of the movable body being an EV and the electric power transmission system charging a storage battery included in the EV will be described below.

Figure 1:
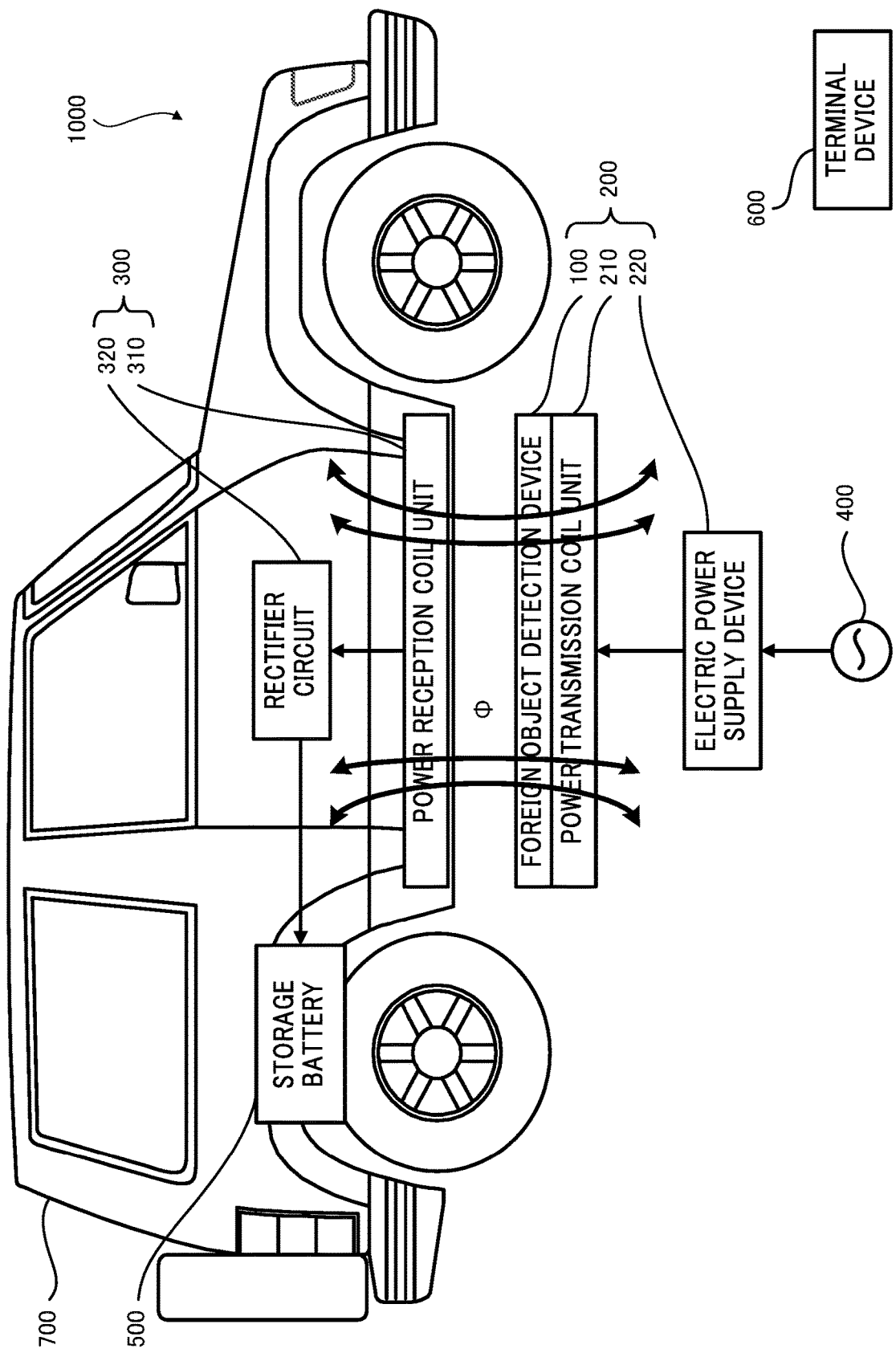
FIG. 1 is a schematic configuration diagram of an electric power transmission system according to Embodiment 1.

FIG. 1 illustrates a schematic configuration of an electric power transmission system 1000 used for charging of a storage battery 500 included in an electric vehicle 700. The electric vehicle 700 travels with a motor driven by electric power charged in the storage battery 500 such as a lithium-ion battery or a lead storage battery as a power source.

As illustrated in FIG. 1, the electric power transmission system 1000 is a system wirelessly transmitting electric power from a power transmission device 200 to a power reception device 300 by magnetic coupling. The electric power transmission system 1000 includes the power transmission device 200 wirelessly transmitting electric power of an alternating-current (AC) or direct-current (DC) commercial power source 400 to the electric vehicle 700, and the power reception device 300 receiving the electric power transmitted by the power transmission device 200 and charging the storage battery 500. Note that the commercial power source 400 is an AC power source in the following description.

The power transmission device 200 is a device wirelessly transmitting electric power to the power reception device 300 by magnetic coupling. The power transmission device 200 includes a foreign object detection device 100 detecting a foreign object, a power transmission coil unit 210 transmitting AC power to the electric vehicle 700, and an electric power supply device 220 supplying AC power to the power transmission coil unit 210.

Figure 2:
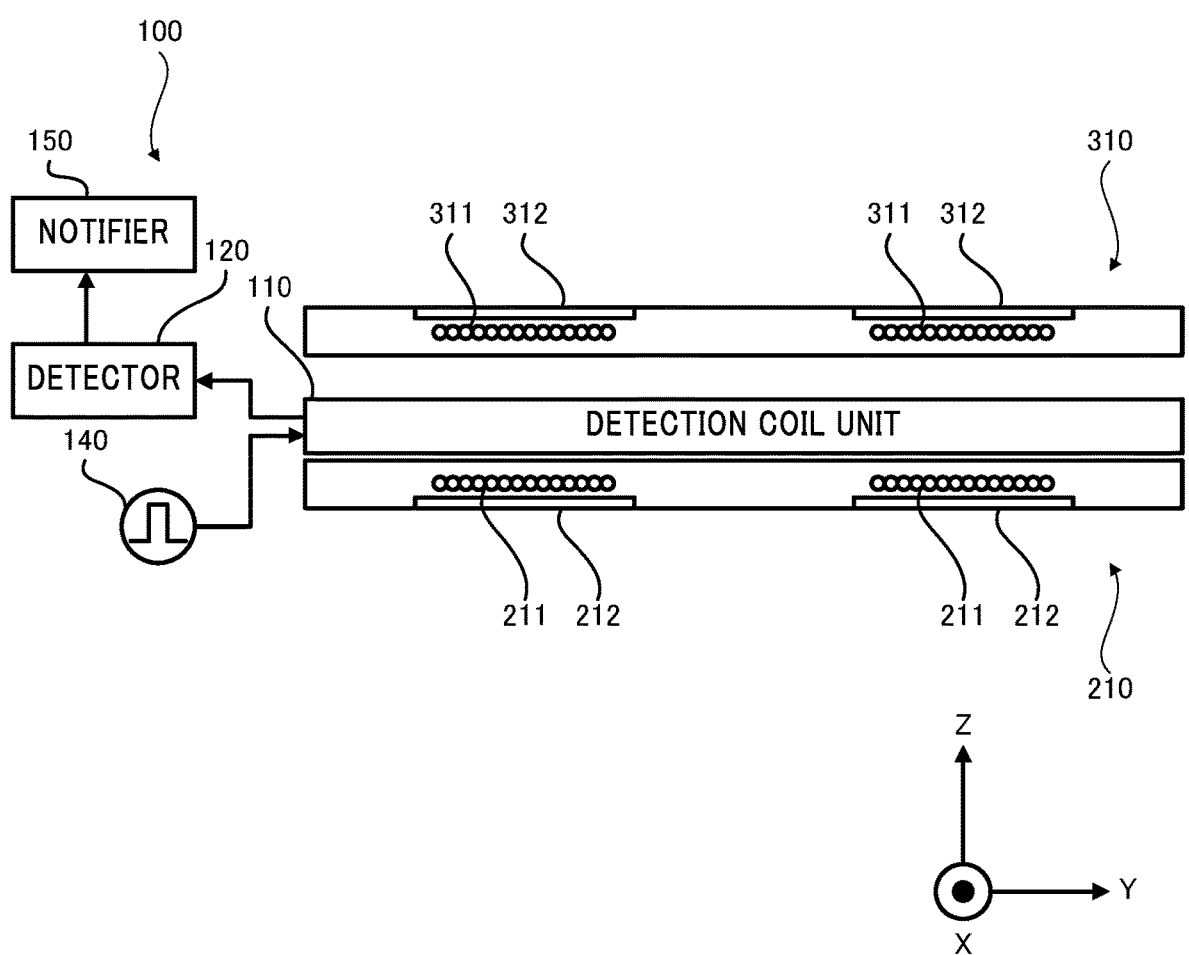
FIG. 2 is a placement diagram of a foreign object detection device according to Embodiment 1.

As illustrated in FIG. 2, the foreign object detection device 100 is placed on the power transmission coil unit 210. In FIG. 2, an axis in an upward vertical direction is a Z-axis, an axis orthogonal to the Z-axis is an X-axis, and an axis orthogonal to the Z-axis and the X-axis is a Y-axis. Details of the foreign object detection device 100 will be described later.

As illustrated in FIG. 2, the power transmission coil unit 210 includes a power transmission coil 211 being supplied with AC power by the electric power supply device 220 and inducing alternating magnetic flux 1, and a magnetic body plate 212 allowing passage of a magnetic force generated by the power transmission coil 211 and suppressing loss of the magnetic force.

The power transmission coil 211 is configured by spirally winding a conductive wire on the magnetic body plate 212. The power transmission coil 211 and a capacitor provided at each of two ends of the power transmission coil 211 form a resonant circuit and induce alternating magnetic flux Φ by AC current flowing according to application of AC voltage.

The magnetic body plate 212 has a plate shape having a hole in the central part and includes a magnetic body. For example, the magnetic body plate 212 is a plate-shaped member including ferrite being a composite oxide of iron oxide and metal. The magnetic body plate 212 may be formed of an aggregate of segmented magnetic bodies, and the segmented magnetic bodies may be placed in a frame shape having an opening in the central part.

The electric power supply device 220 includes a power factor improvement circuit improving the power factor of commercial AC power supplied by the commercial power source 400 and an inverter circuit generating AC power to be supplied to the power transmission coil 211. The power factor improvement circuit rectifies and boosts AC power generated by the commercial power source 400 and converts the power into DC power having a predetermined voltage value. The inverter circuit converts DC power generated by electric power conversion by the power factor improvement circuit into AC power at a predetermined frequency. For example, the power transmission device 200 is fixed on the floor surface of a parking lot.

The power reception device 300 is a device wirelessly receiving electric power from the power transmission device 200 by magnetic coupling. The power reception device 300 includes a power reception coil unit 310 receiving AC power transmitted by the power transmission device 200 and a rectifier circuit 320 converting AC power supplied from the power reception coil unit 310 into DC power and supplying the DC power to the storage battery 500.

As illustrated in FIG. 2, the power reception coil unit 310 includes a power reception coil 311 inducing an electromotive force according to a change in the alternating magnetic flux Φ induced by the power transmission coil 211, and a magnetic body plate 312 allowing passage of a magnetic force generated by the power reception coil 311 and suppressing loss of the magnetic force. The power reception coil 311 and a capacitor provided at each of two ends of the power reception coil 311 configure a resonant circuit.

The power reception coil 311 faces the power transmission coil 211 when the electric vehicle 700 is at a standstill at a preset position. When the power transmission coil 211 induces the alternating magnetic flux Φ by receiving electric power from the electric power supply device 220, an induced electromotive force is induced in the power reception coil 311 by interlinkage of the alternating magnetic flux Φ with the power reception coil 311.

The magnetic body plate 312 has a plate shape having a hole in the central part and includes a magnetic body. For example, the magnetic body plate 312 is a plate-shaped member including ferrite being a composite oxide of iron oxide and metal. The magnetic body plate 312 may be formed of an aggregate of segmented magnetic bodies, and the segmented magnetic bodies may be placed in a frame shape having an opening in the central part.

The rectifier circuit 320 generates DC power by rectifying an electromotive force induced in the power reception coil 311. The DC power generated by the rectifier circuit 320 is supplied to the storage battery 500. The power reception device 300 may include, between the rectifier circuit 320 and the storage battery 500, a charging circuit converting DC power supplied from the rectifier circuit 320 into DC power suitable for charging the storage battery 500. For example, the power reception device 300 is fixed to the chassis of the electric vehicle 700.

A terminal device 600 is a device receiving notification of existence of a foreign object from the foreign object detection device 100. For example, the terminal device 600 is a smartphone carried by an owner of the electric vehicle 700. When receiving notification of existence of a foreign object from the foreign object detection device 100, the terminal device 600 informs a user of the existence of the foreign object by a screen display, a voice output, or the like.

The foreign object detection device 100 detects a foreign object existing in a detection target area. The detection target area is a target area of foreign object detection and is an area in which a foreign object can be detected. The detection target area is an area near the power transmission coil unit 210 and the power reception coil unit 310 and is an area including an area between the power transmission coil unit 210 and the power reception coil unit 310. A foreign object is an object or a living body not required for electric power transmission.

When placed in the detection target area during electric power transmission, a foreign object may adversely affect electric power transmission or may generate heat. Therefore, the foreign object detection device 100 detects a foreign object existing in the detection target area and notifies a user of the detection of the foreign object. The user receives the notification and may remove the foreign object. Various objects such as a metal piece, a person, and an animal may be assumed as foreign objects.

As illustrated in FIG. 2, the foreign object detection device 100 includes a detection coil unit 110, a detector 120, a pulse generator 140, and a notifier 150.

Figure 3:
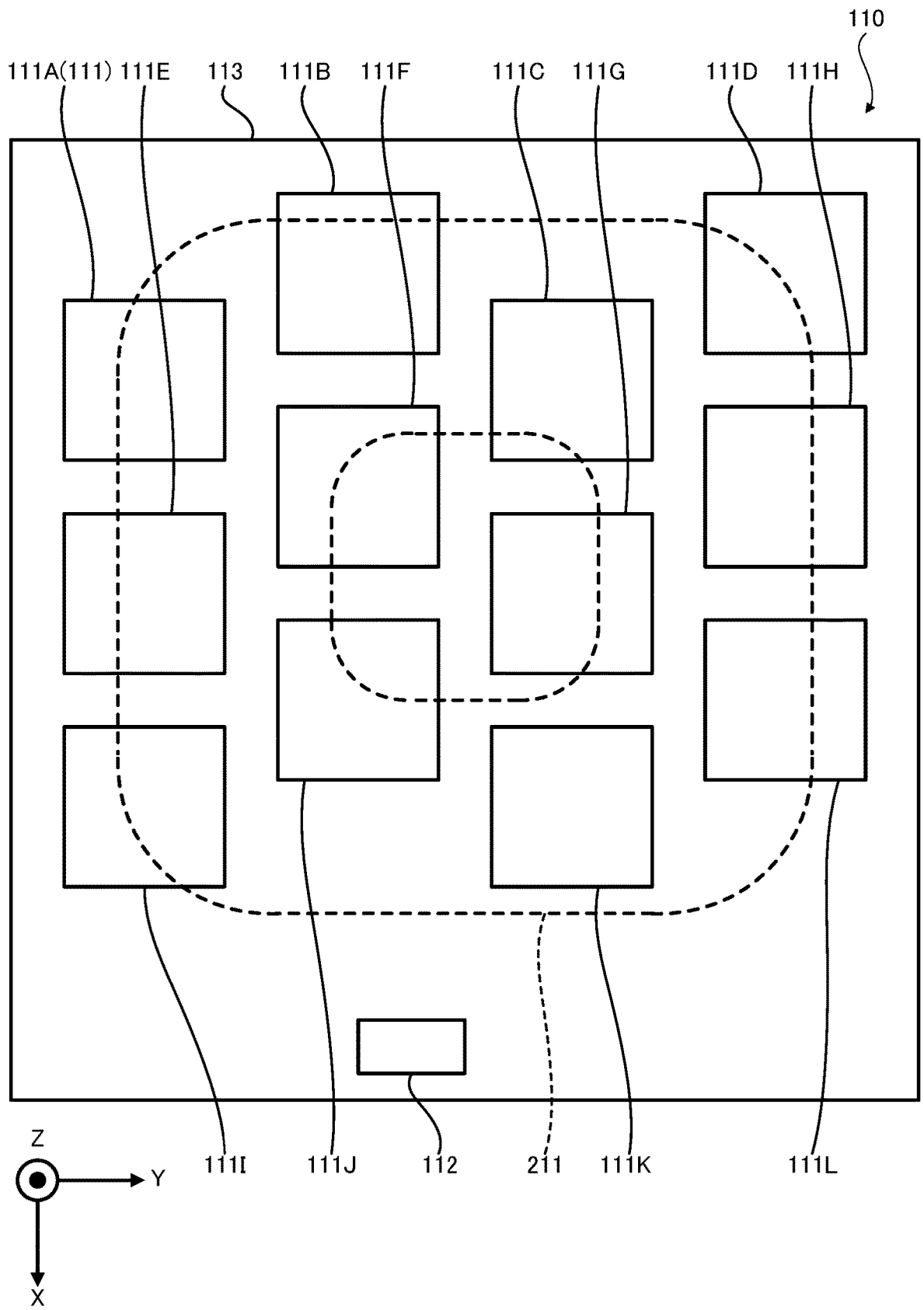
FIG. 3 is a plan view of the foreign object detection device according to Embodiment 1.

The detection coil unit 110 is a unit detecting a foreign object. As illustrated in FIG. 3, the detection coil unit 110 is formed in a flat plate shape and is placed on the power transmission coil unit 210 in such a way as to overlap the power transmission coil 211 in a plan view. The detection coil unit 110 includes a detection coil substrate 113 made of a magnetically permeable material typified by resin. Sensor coils 111 placed in a matrix shape in the X-axis direction and the Y-axis direction to cover the power transmission coil 211, and an external connection connector 112 connecting each sensor coil 111 to the detector 120 and the pulse generator 140 are implemented on the detection coil substrate 113.

Note that the number and placement of the sensor coils 111 illustrated in FIG. 3 are exemplifications. In other words, the number and placement of sensor coils 111 included in the detection coil unit 110 are not limited to those illustrated in FIG. 3. The same holds for succeeding diagrams.

The detector 120 determines whether a foreign object exists in the detection target area, based on output voltage output from each of the sensor coils 111 included in the detection coil unit 110. Details of the detector 120 will be described later.

The pulse generator 140 includes a pulse generator generating a pulse and generates pulse voltage being a pulse-shaped voltage signal as input voltage for foreign object detection. The pulse generator 140 applies the generated pulse voltage to each of the sensor coils 111 included in the detection coil unit 110.

The notifier 150 includes a communication interface for communicating with equipment outside the foreign object detection device 100 in accordance with a well-known communication standard such as a wireless local area network (LAN). When a foreign object is detected by the detector 120, the notifier 150 notifies a user of the detection of the foreign object. For example, the notifier 150 transmits information indicating that the foreign object is detected to a terminal device 600 carried by the user.

Figure 4:
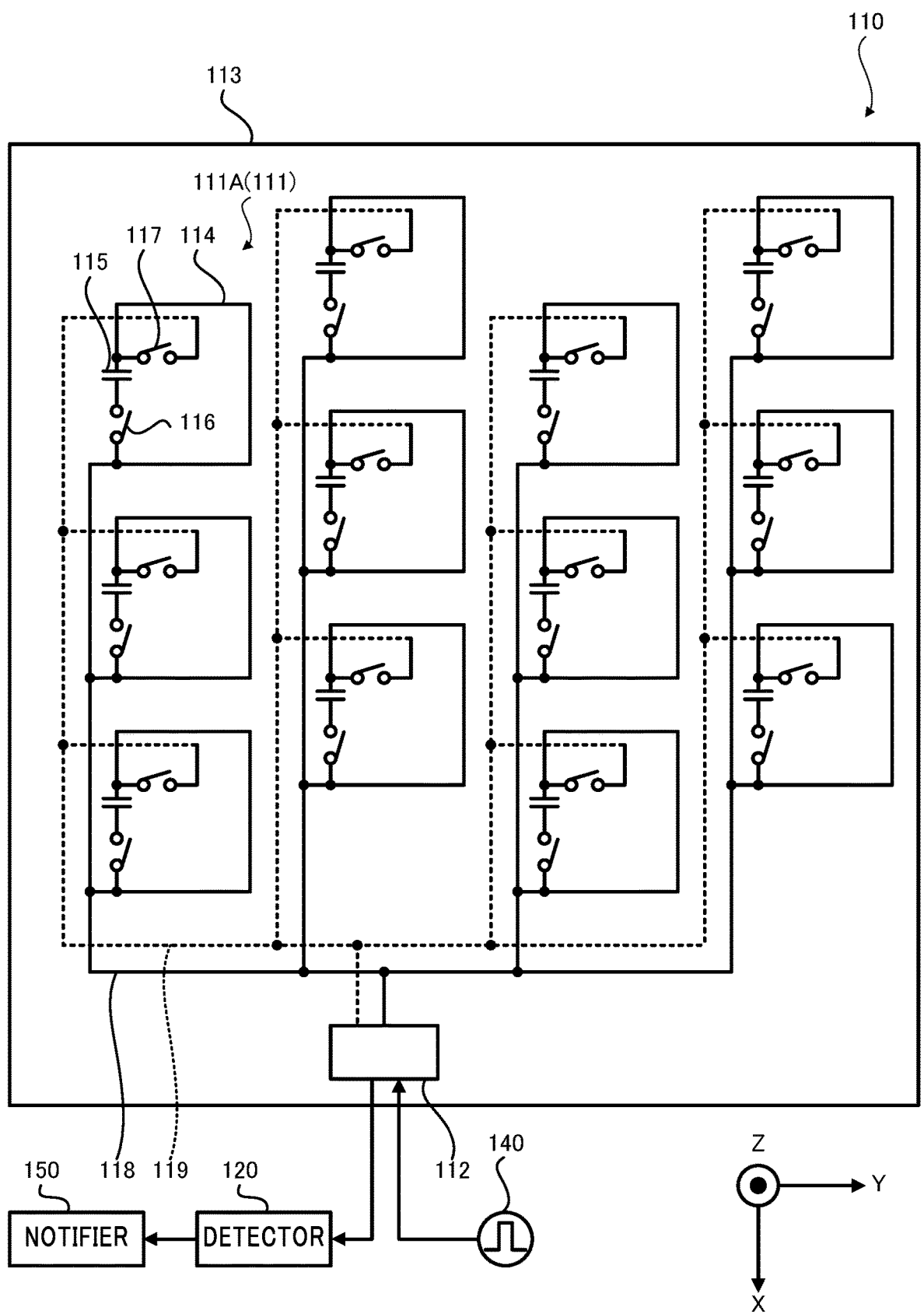
FIG. 4 is a plan view of a detection coil unit according to Embodiment 1.

Next, a configuration of the sensor coil 111 will be described in detail with reference to FIG. 4 and FIG. 5. The sensor coil 111 is a general name for sensor coils 111A to 111L. The sensor coils 111 practically have similar configurations. The sensor coil 111 includes a coil 114, a capacitor 115, a switch 116, and a switch 117. In consideration of viewability of the drawing, only the sensor coil 111A is given signs in FIG. 4.

The coil 114 has a conductor pattern wound one or more turns around an axis parallel to the Z-axis on the top surface of the detection coil substrate 113. One terminal of the coil 114 is connected to one terminal of the switch 116 and a first connection wiring 118. The first connection wiring 118 is placed on the top surface of the detection coil substrate 113 and is connected to the external connection connector 112. The other terminal of the coil 114 is connected to one terminal of the capacitor 115 and one terminal of the switch 117. The other terminal of the switch 117 is connected to a second connection wiring 119. The other terminal of the capacitor 115 is connected to the other terminal of the switch 116. The second connection wiring 119 is placed on the back surface of the detection coil substrate 113 and is connected to the external connection connector 112.

The switch 116 and the switch 117 are controlled to an on-state or an off-state in accordance with control from the detector 120 through an unillustrated control line. The on-state is a conducting state, and the off-state is a nonconducting state. The switch 116 has a function of changing the state between the coil 114 and the capacitor 115. When the switch 116 is turned on, the coil 114 and the capacitor 115 form a resonant circuit. The switch 117 has a function of changing the state between the resonant circuit and the pulse generator 140. The resonance frequency of the resonant circuit is designed to be several MHz as an example.

When both the switch 116 and the switch 117 are in the on-state, the coil 114 and the capacitor 115 form the resonant circuit. The resonant circuit is electrically connected to the detector 120 and the pulse generator 140 through the first connection wiring 118 and the second connection wiring 119. Therefore, voltage between both ends of the resonant circuit, that is, voltage between both ends of the coil 114 is introduced to the detector 120 through the first connection wiring 118 and the second connection wiring 119.

On the other hand, when the switch 116 is in the off-state, the coil 114 and the capacitor 115 do not form the resonant circuit. Further, when the switch 117 is in the off-state, the resonant circuit is electrically disconnected from the detector 120 and the pulse generator 140.

Figure 5:
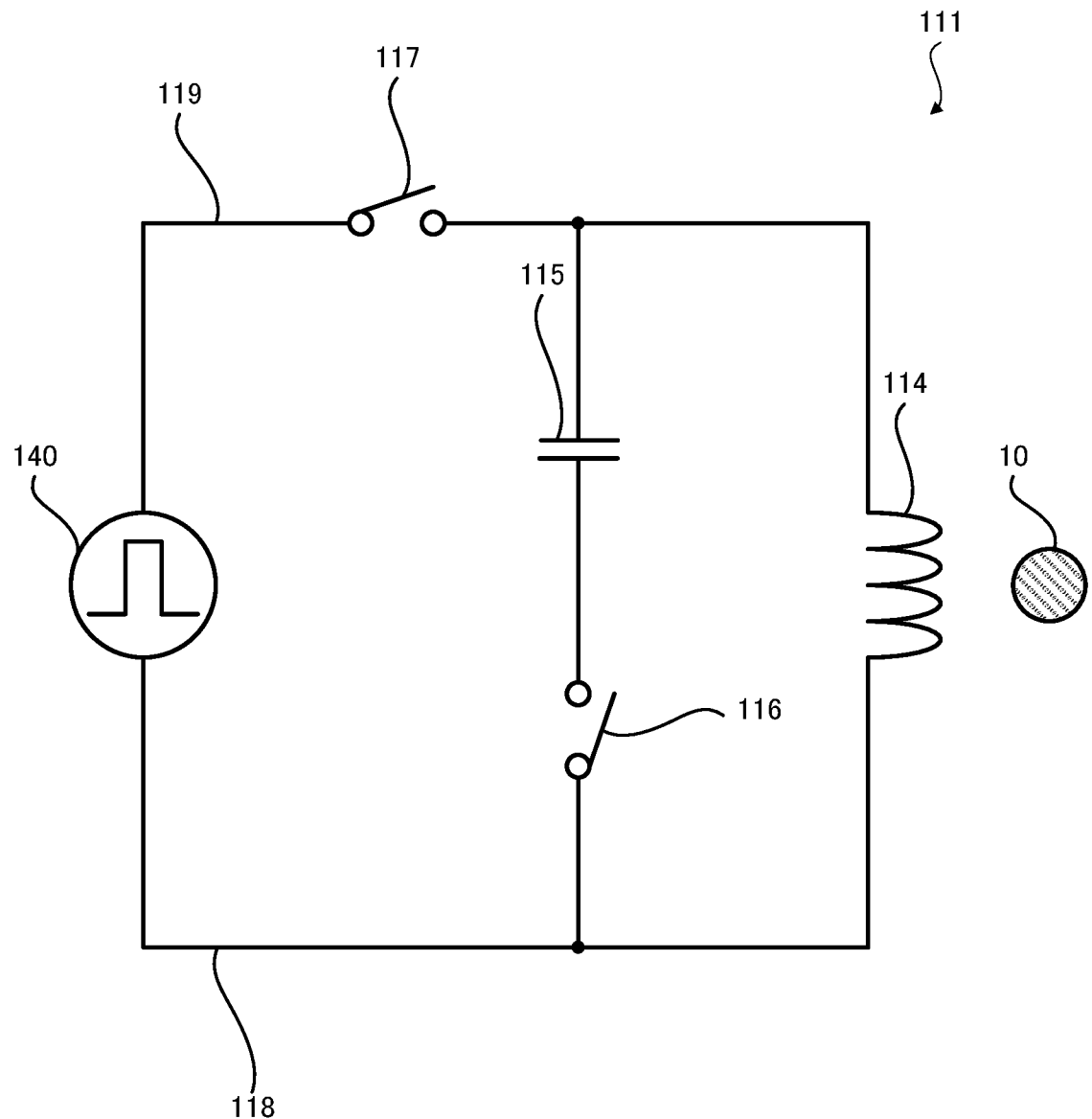
FIG. 5 is an equivalent circuit of a resonant circuit included in the detection coil unit according to Embodiment 1.

FIG. 5 illustrates an equivalent circuit of the resonant circuit formed by the coil 114 and the capacitor 115. When pulse voltage is input from the pulse generator 140 in a state of the switches 116 and 117 being closed and the coil 114 and the capacitor 115 forming the resonant circuit, pulse-shaped voltage is applied between both ends of the resonant circuit.

When pulse voltage is input, energy is accumulated in the coil 114 and the capacitor 115, and voltage between both ends of the resonant circuit oscillates while attenuating with a fall of the pulse voltage. Therefore, the resonant circuit outputs oscillating voltage the peak value of which gradually attenuates as time progresses to the detector 120 as response voltage to the pulse voltage.

When a foreign object 10 exists near the resonant circuit, a change in the inductance of the coil 114 occurs. Therefore, the frequency of the oscillating voltage changes and a degree of attenuation of the oscillating voltage changes when a foreign object 10 exists, compared with a case that the foreign object 10 does not exist. The detector 120 determines existence of the foreign object 10 by detecting a change in the frequency of the oscillating voltage, a change in a degree of attenuation of the oscillating voltage, or the like.

On the other hand, even in a case of pulse voltage not being input from the pulse generator 140, induced voltage is induced in the coil 114 by alternating magnetic flux $\Phi$ generated by the power transmission coil 211 when electric power is transmitted from the power transmission device 200 to the power reception device 300.

Specifically, when AC current is supplied to the power transmission device 200 from the electric power supply device 220 and the power transmission coil 211 induces the alternating magnetic flux $\Phi$, induced voltage according to a change in the alternating magnetic flux $\Phi$ is generated between both ends of the coil 114. The induced voltage is voltage generated by such a magnetic force during electric power transmission. The induced voltage induced in the coil 114 is output to the detector 120, similarly to response voltage to pulse voltage.

Figure 6:
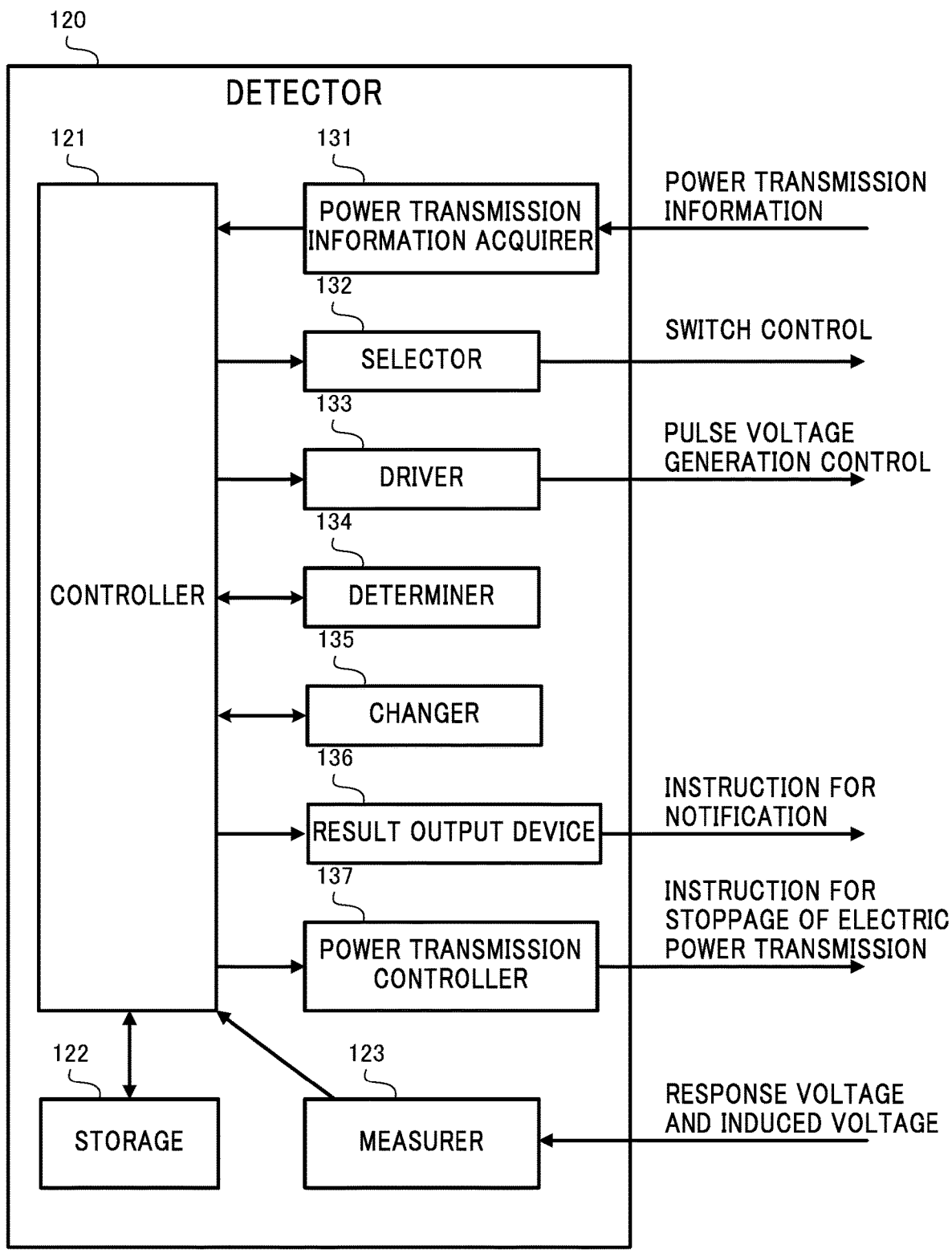
FIG. 6 is a configuration diagram of a detector included in the foreign object detection device according to Embodiment 1.

Next, the detector 120 will be described in detail. As illustrated in FIG. 6, the detector 120 includes a controller 121, a storage 122, and a measurer 123.

The controller 121 includes a central processing unit (CPU). The CPU includes a microprocessor or the like and is a central processing unit executing various types of processing and operations. In the controller 121, the CPU reads a control program stored in a ROM and controls operation of the entire detector 120 while using a RAM as a work memory.

The storage 122 includes a read only memory (ROM), a random access memory (RAM), a flash memory, and the like. The storage 122 stores a program and data used by the controller 121 for performing various types of processing. Further, the storage 122 stores data generated or acquired by performing various types of processing by the controller 121.

The measurer 123 measures output voltage output from each of the sensor coils 111 included in the detection coil unit 110. Specifically, the measurer 123 includes an analog/digital (A/D) conversion circuit, a peak hold circuit, and the like. The measurer 123 converts an analog signal output from each sensor coil 111 into a digital signal by the A/D converter and measures a voltage value of the digital signal after the A/D conversion.

More specifically, when pulse voltage is input from the pulse generator 140, the measurer 123 measures response voltage to the pulse voltage. Further, even in a case of pulse voltage not being input from the pulse generator 140, the measurer 123 measures induced voltage induced by the alternating magnetic flux $\Phi$ when electric power is transmitted from the power transmission device 200. Thus, the measurer 123 measures two types of voltage signals being response voltage and induced voltage.

When response voltage is measured, the switch 116 is set to the on-state, and a resonant circuit is formed by the coil 114 and the capacitor 115. In this state, the measurer 123 measures, as response voltage, voltage between both ends of the resonant circuit when pulse voltage is input from the pulse generator 140. On the other hand, when induced voltage is measured, the switch 116 is set to the off-state, and the capacitor 115 is detached from the circuit. Therefore, the resonant circuit is not formed. In this state, the measurer 123 measures, as induced voltage, voltage between both ends of the coil 114 when electric power is transmitted by the power transmission device 200.

Further, as illustrated in FIG. 6, the detector 120 functionally includes a power transmission information acquirer 131, a selector 132, a driver 133, a determiner 134, a changer 135, a result output device 136, and a power transmission controller 137. The components represent functions of the controller 121. Specifically, in the controller 121, the CPU functions as each component by reading a program stored in the ROM into the RAM and performing control by executing the program.

The power transmission information acquirer 131 acquires power transmission information. The power transmission information is information about electric power transmission by the power transmission device 200 and is specifically information indicating whether the power transmission device 200 is transmitting electric power to the power reception device 300. When the power transmission device 200 starts electric power transmission to the power reception device 300, the electric power supply device 220 notifies the detector 120 that electric power is being transmitted. Further, when the power transmission device 200 ends electric power transmission to the power reception device 300, the electric power supply device 220 notifies the detector 120 that electric power is not being transmitted. The power transmission information acquirer 131 acquires information thus notified from the electric power supply device 220 as power transmission information.

Alternatively, as power transmission information, the power transmission information acquirer 131 may acquire information indicating transmitted power of the power transmission device 200 from the power transmission device 200 or may acquire information indicating received power of the power reception device 300 from the power reception device 300 through wireless communication. When the transmitted power or the received power is practically zero, electric power can be determined to be not being transmitted from the power transmission device 200 to the power reception device 300; and when the transmitted power or the received power is not practically zero, electric power can be determined to be being transmitted from the power transmission device 200 to the power reception device 300.

The selector 132 selects one sensor coil 111 being a target of foreign object detection processing of the sensor coils 111 included in the detection coil unit 110 in accordance with a predetermined selection rule. Specifically, the selector 132 individually and sequentially selects sensor coils 111A to 111L in an order of the sensor coil 111A, the sensor coil 111B, . . . , the sensor coil 111L, the sensor coil 111A, the sensor coil 111B, . . . .

When selecting one sensor coil 111, the selector 132 controls the switch 116 and the switch 117 in the selected sensor coil 111 in order to detect existence of a foreign object 10 close to the selected sensor coil 111. Specifically, when measuring induced voltage, the selector 132 sets the switch 116 in the selected sensor coil 111 to the on-state and sets the switch 117 to the off-state. Further, when measuring response voltage, the selector 132 sets the switch 116 and the switch 117 in the selected sensor coil 111 to the on-state. The selector 132 sets the switch 116 and the switch 117 in an unselected sensor coil 111 to the off-state.

The driver 133 drives the pulse generator 140 and causes the pulse generator 140 to generate single pulse voltage after execution of selection and on-state control by the selector 132. Thus, the driver 133 inputs the pulse voltage generated in the pulse generator 140 to a sensor coil 111 selected by the selector 132 as input voltage.

The pulse voltage generated in the pulse generator 140 is applied to a resonant circuit formed in the sensor coil 111 selected by the selector 132 through the external connection connector 112, the first connection wiring 118, the second connection wiring 119, and the like. Voltage between both ends of the resonant circuit is introduced to the measurer 123 through the external connection connector 112, the first connection wiring 118, the second connection wiring 119, and the like.

When the pulse voltage is input as input voltage, the sensor coil 111 selected by the selector 132 outputs oscillating voltage representing the voltage between both ends of the resonant circuit as response voltage. The measurer 123 measures the response voltage output from the sensor coil 111.

Based on output voltage output from a sensor coil 111, the determiner 134 determines whether a foreign object 10 exists near the sensor coil 111. The output voltage is specifically response voltage output from a sensor coil 111 as a response to pulse voltage input from the pulse generator 140, according to Embodiment 1. The determiner 134 determines existence of a foreign object 10, based on a comparison result between a comparison target value based on response voltage output from a sensor coil 111 and a threshold value set to the sensor coil 111.

The comparison target value is a target value compared with the threshold value. Specifically, the comparison target value is a difference value between a value indicating a characteristic of response voltage measured by the measurer 123 and a reference value, or a value based on the difference value. A case of the comparison target value being a difference value between a value indicating a characteristic of response voltage and a reference value will be described below as an example.

Examples of a value indicating a characteristic of response voltage include a frequency of oscillating voltage, a convergence time of oscillating voltage, and magnitude of amplitude of oscillating voltage. For example, the convergence time of oscillating voltage refers to a time period from application of pulse voltage until the amplitude of the oscillating voltage converges to a predetermined amplitude or less. For example, the magnitude of amplitude of oscillating voltage refers to the magnitude of the amplitude of the oscillating voltage when a predetermined time elapses from application of pulse-shaped voltage. A value indicating a characteristic indicating response voltage for acquiring a comparison target value may be adjusted as appropriate.

The reference value is a value indicating a characteristic of response voltage when a foreign object 10 does not exist close to a sensor coil 111. The reference value is preset based on an experiment, a simulation, or the like and is stored in the storage 122.

The determiner 134 calculates, as a comparison target value, a difference value between a value indicating a characteristic of response voltage measured by the measurer 123 and the reference value. Thus, the determiner 134 calculates a variation between a value indicating a characteristic of response voltage output from the sensor coil 111 as a response to pulse voltage input from the pulse generator 140 and the value when a foreign object 10 does not exist. A small difference value means a high likelihood that a foreign object 10 does not exist, and a large difference value means a high likelihood that a foreign object 10 exists.

When calculating the difference value as a comparison target value, the determiner 134 compares the comparison target value with the threshold value. Then, when an excess count of the comparison target value exceeding the threshold value reaches a predetermined threshold count, the determiner 134 determines that a foreign object 10 exists.

The threshold value is a threshold value for determining a comparison target value. The threshold value is individually set to each of the sensor coils 111 included in the detection coil unit 110 and is stored in the storage 122. For example, the threshold value is preset in consideration of predicted magnitude of noise, a degree of change in response voltage due to existence of a foreign object 10, and the like.

The threshold count is a threshold value for determining an excess count. When an excess count reaches the threshold count, a foreign object 10 is determined to exist. For example, the threshold count is predetermined in consideration of a likelihood of noise generation, the magnitude of risk due to existence of a foreign object 10, and the like and is stored in the storage 122. An increased threshold count allows suppression of erroneous determination and enhanced reliability of foreign object detection. Further, a decreased threshold count allows increased response speed of foreign object detection.

Figure 7:
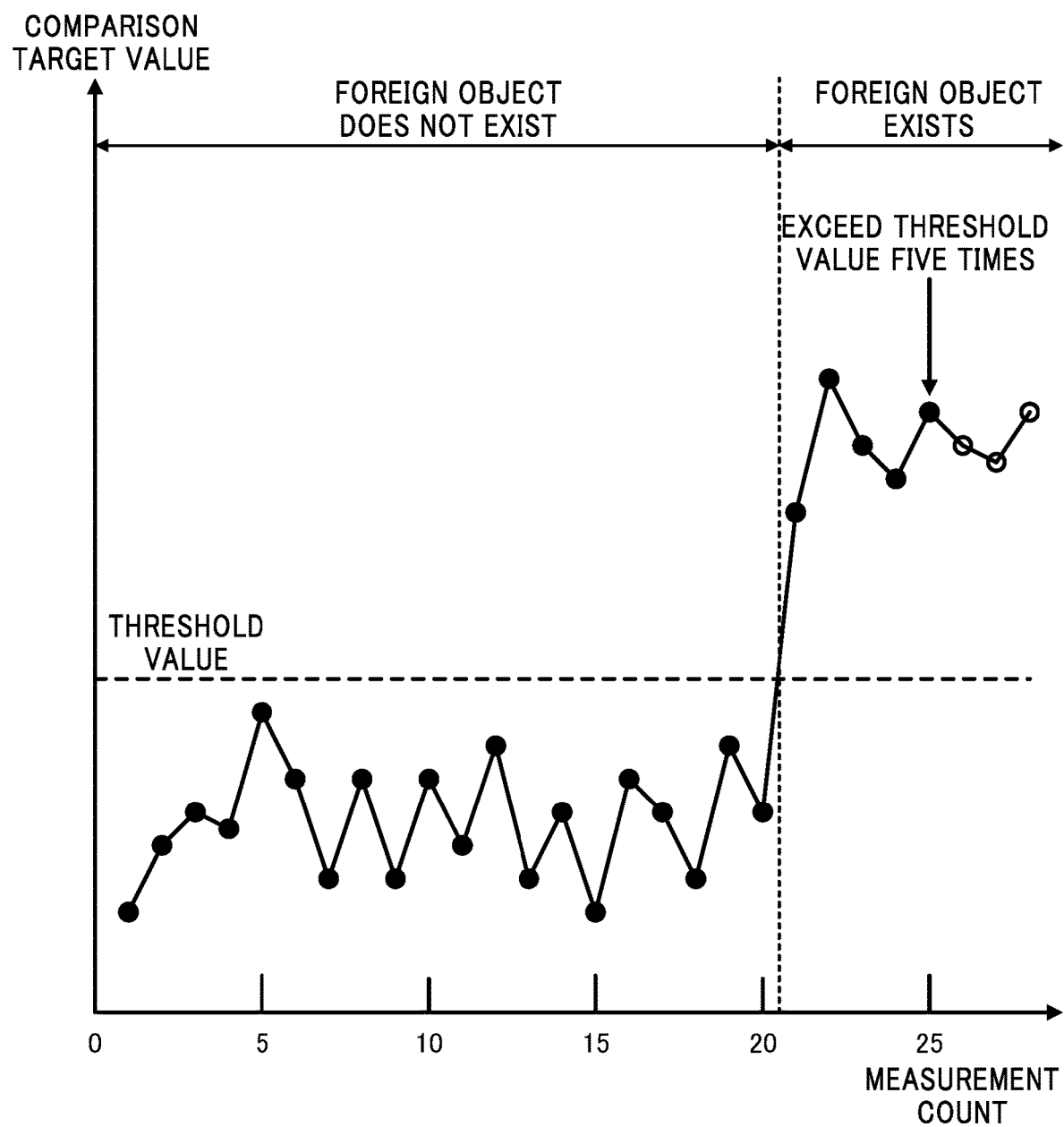
FIG. 7 is a graph illustrating a correspondence between a measurement count and a comparison target value, according to Embodiment 1.

An example of a foreign object 10 being determined to exist by a comparison target value consecutively exceeding the threshold value a number of times equal to or greater than the threshold count will be described below with reference to FIG. 7. FIG. 7 illustrates a correspondence between a measurement count of response voltage by the measurer 123 and a comparison target value based on response voltage. The graph illustrated in FIG. 7 illustrates a scene in which the comparison target value does not exceed the threshold value from the first measurement to the twentieth measurement and the comparison target value exceeds the threshold value from the twenty-first measurement onward. For example, when the threshold count is 5, the determiner 134 determines that a foreign object 10 exists when the twenty-fifth measurement is completed.

The determiner 134 executes such determination processing of determining existence of a foreign object 10 on sensor coils 111 individually and sequentially selected by the selector 132, based on a comparison result between a comparison target value and a threshold value. Specifically, the determiner 134 executes the determination processing of determining existence of a foreign object 10 on each of the sensor coils 111, based on a comparison result between a comparison target value based on response voltage output from one sensor coil 111 as a response to input voltage input to the one sensor coil 111 of the sensor coils 111, and a threshold value set to the one sensor coil 111. Thus, the determiner 134 determines whether a foreign object 10 exists close to each of the sensor coils 111.

Returning to FIG. 6, based on induced voltage induced in a sensor coil 111 by magnetic flux generated by the power transmission coil 211, the changer 135 executes threshold value change processing of changing a threshold value set to the sensor coil 111 on each of the sensor coils 111. The threshold value is a value used for determining existence of a foreign object 10 in the aforementioned determination processing by the determiner 134.

As described above, when electric power is transmitted from the power transmission device 200 to the power reception device 300, induced voltage is induced in each sensor coil 111 by alternating magnetic flux $\Phi$ induced by the power transmission coil 211. The density of the alternating magnetic flux $\Phi$ induced by the power transmission coil 211 is not uniform in the detection target area, and unevenness depending on the location in the detection target area occurs based on characteristics, shapes, placement, and the like of the power transmission coil 211, the power reception coil 311, and the magnetic body plate 312. Therefore, the magnitude of induced voltage induced in each sensor coil 111 is not the same across the sensor coils 111, and a difference between the sensor coils 111 occurs.

When such a difference in magnitude of induced voltage between the sensor coils 111 occurs in a case that threshold values set to the sensor coils 111 are the same, a foreign object 10 may not be precisely detected when electric power is transmitted by the power transmission device 200. Therefore, in order to enhance detection precision of a foreign object 10 when electric power is transmitted, the changer 135 individually changes the threshold values set to the sensor coils 111, based on the magnitude of induced voltage induced in each sensor coil 111.

When electric power is transmitted by the power transmission device 200, the changer 135 refers to a voltage value of induced voltage being output from a sensor coil 111 selected by the selector 132 and being measured by the measurer 123. Then, the changer 135 uses the voltage value as the magnitude of induced voltage induced in the selected sensor coil 111.

FIG. 8 illustrates an example of the magnitude of induced voltage induced in each of sensor coils 111. As an example, FIG. 8 illustrates 36 sensor coils 111 placed in 6×6. For ease of understanding, the following description assumes that induced voltage of the same magnitude is induced in each of sensor coils 111 in the same color. In the example in FIG. 8, an induced voltage of 10 V is induced in each of four sensor coils 111 in the central part, an induced voltage of 20 V is induced in each of 12 sensor coils 111 in the surrounding area of the central part (hereinafter referred to as an "intermediate part"), and an induced voltage of 15 V is further induced in each of 20 sensor coils 111 in the surrounding area of the intermediate part (hereinafter referred to as an "outer part"). In other words, magnetic flux density of alternating magnetic flux Φ is relatively high and high induced voltage is induced in an area where the 12 sensor coils 111 in the intermediate part are placed.

In general, the temperature at a location where magnetic flux density is relatively high tends to rise rapidly when a foreign object 10 exists, compared with a location where magnetic flux density is relatively low. Therefore, it is desirable that a foreign object 10 existing at a location where magnetic flux density is relatively high be more promptly and more reliably detected compared with a foreign object 10 existing at a location where magnetic flux density is relatively low. Therefore, the changer 135 changes a threshold value for a sensor coil 111 in which a relatively high induced voltage is induced to a value smaller than a threshold value for a sensor coil 111 in which a relatively low induced voltage is induced.

When a threshold value decreases, the determiner 134 determines that a foreign object 10 exists even when the difference between a comparison target value and a reference value is small. Therefore, the changer 135 changes a threshold value for a sensor coil 111 in which a relatively high induced voltage is induced to a value sufficiently small to the extent that a foreign object 10 is not erroneously detected. Thus, when a foreign object 10 exists at a location where magnetic flux density is relatively high, the foreign object 10 can be more promptly and reliably detected.

More specifically, when induced voltage induced in a first sensor coil 111 of the sensor coils 111 is higher than induced voltage induced in a second sensor coil 111 of the sensor coils 111, the changer 135 makes a threshold value set to the first sensor coil 111 smaller than a threshold value set to the second sensor coil 111.

The first sensor coil 111 and the second sensor coil 111 correspond to two or more sensor coils 111 with varying magnitude of induced voltage of the sensor coils 111 included in the detection coil unit 110. For example, the first sensor coil 111 corresponds to 12 sensor coils 111 in the intermediate part in FIG. 8 where a relatively high induced voltage is induced, and the second sensor coil 111 corresponds to four sensor coils 111 in the central part in FIG. 8 where a relatively low induced voltage is induced. Alternatively, the first and second sensor coils 111 may be considered to correspond to sensor coils 111 in the intermediate part and the outer part, respectively, or may be considered to correspond to sensor coils 111 in the outer part and the central part, respectively.

FIG. 9 illustrates an example of a threshold value changed by the changer 135 in a case of the induced voltage illustrated in FIG. 8 being induced in each sensor coil 111. A threshold value set to each sensor coil 111 is represented by a ratio (%) to a reference value in FIG. 9. In the example in FIG. 9, the changer 135 changes a threshold value for a sensor coil 111 in the central part where induced voltage is relatively low to a relatively large value of 50%, changes a threshold value for a sensor coil 111 in the intermediate part where induced voltage is relatively high to a relatively small value of 20%, and changes a threshold value for a sensor coil 111 in the outer part where the magnitude of induced voltage is moderate to a moderate value of 30%.

Figure 10:
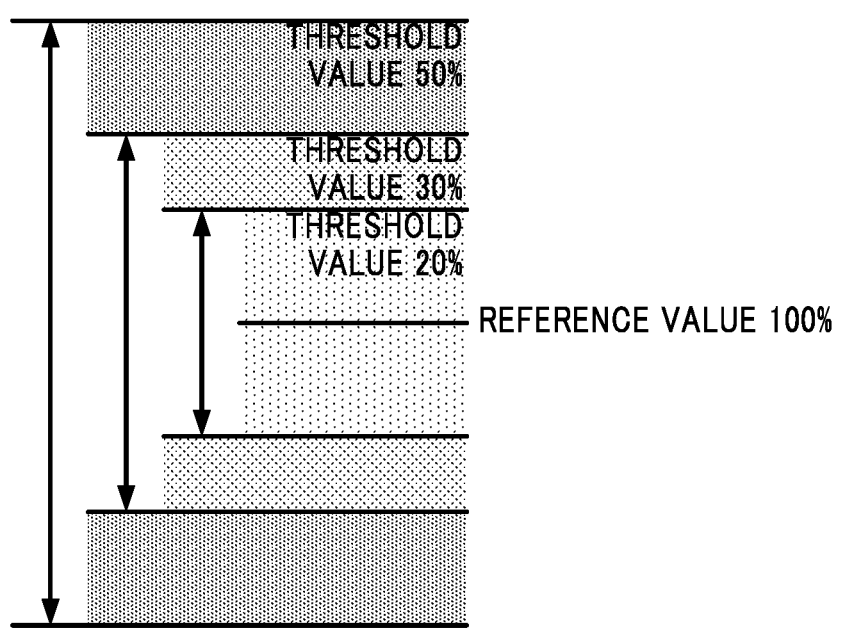
FIG. 10 is a diagram illustrating a relation between the threshold values illustrated in FIG. 9 and a reference value.

Thus, the changer 135 changes a threshold value for a sensor coil 111 with a relatively high induced voltage of the sensor coils 111 to a relatively small value and changes a threshold value for a sensor coil 111 with a relatively low induced voltage to a relatively large value. As a result, threshold values, such as 20%, 30%, and 50%, that are nonuniform relative to the reference value are set depending on the sensor coil 111, as illustrated in FIG. 10. The determiner 134 determines existence of a foreign object 10 near each of the sensor coils 111, based on the threshold value changed by the changer 135.

Returning to FIG. 6, the result output device 136 outputs a foreign object detection result by the determiner 134. For example, when a foreign object 10 is determined to exist by the determiner 134, the result output device 136 instructs the notifier 150 to notify that a foreign object 10 exists. When receiving the notification from the determiner 134, the notifier 150 transmits information indicating the detection of the foreign object 10 to a terminal device 600 carried by a user. When receiving the information, the terminal device 600 informs the user of the detection of the foreign object 10 by a screen display, a voice output, or the like. When receiving the information about existence of the foreign object 10 from the terminal device 600, the user removes the foreign object 10.

The power transmission controller 137 controls electric power transmission to the power reception coil unit 310 by the power transmission coil unit 210. Specifically, when a foreign object 10 is determined to exist by the determiner 134, the power transmission controller 137 causes the electric power supply device 220 to restrict supply of AC power to the power transmission coil 211 in order to avoid occurrence of a problem caused by the foreign object 10.

Restricting supply of AC power means stopping supply of AC power or decreasing the supply to the extent that a problem does not occur. A case of the power transmission controller 137 giving an instruction to stop supply of AC power as restriction on supply of AC power will be described below as an example. When being instructed to stop supply of AC power, the electric power supply device 220 stops supply of AC power to the power transmission coil 211. Thus, electric power transmission by the power transmission device 200 stops.

Figure 11:
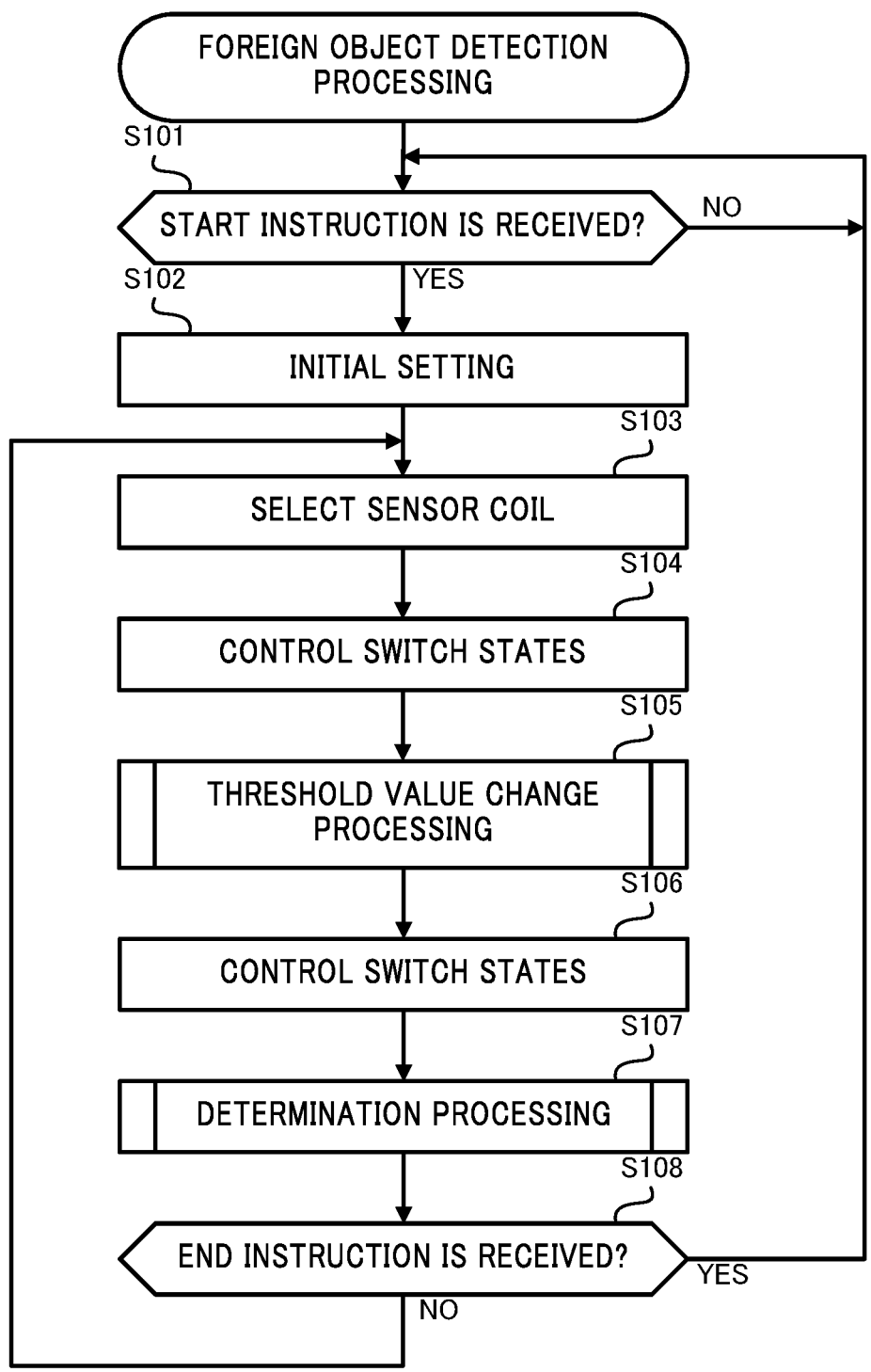
FIG. 11 is a flowchart illustrating foreign object detection processing executed by the foreign object detection device according to Embodiment 1.

Next, foreign object detection processing executed by the foreign object detection device 100 will be described with reference to FIG. 11. For example, the foreign object detection processing illustrated in FIG. 11 is started when power to the foreign object detection device 100 is turned on.

First, the detector 120 determines whether a start instruction for the foreign object detection processing is received (Step S101). Specifically, when electric power is determined to be being transmitted from the power transmission device 200 to the power reception device 300, based on power transmission information acquired by the power transmission information acquirer 131, the detector 120 determines that a start instruction is received.

When determining that a start instruction for the foreign object detection processing is received (Step S101: YES), the detector 120 executes initial setting for the foreign object detection processing (Step S102). For example, the switches 116 and the switches 117 included in the detection coil unit 110 are set to the off-state in the initial setting.

When executing initial setting, the detector 120 functions as the selector 132 and selects one sensor coil 111 of the sensor coils 111 (Step S103). Specifically, the detector 120 selects one sensor coil 111 being a target of the determination processing of the sensor coils 111 included in the detection coil unit 110 in accordance with a predetermined selection rule.

When selecting one sensor coil 111, the detector 120 controls states of the switches 116 and 117 (Step S104). Specifically, the detector 120 controls switches 116 and 117 in each sensor coil 111 included in the detection coil unit 110 in such a way that the switch 117 included in the selected sensor coil 111 is set to the on-state and the switch 116 included in the selected sensor coil 111 and all switches 116 and 117 included in unselected sensor coils 111 are set to the off-state.

When controlling the states of the switches 116 and 117, the detector 120 functions as the changer 135 and executes the threshold value change processing on the selected sensor coil 111 (Step S105). Details of the threshold value change processing will be described with reference to FIG. 12.

Figure 12:
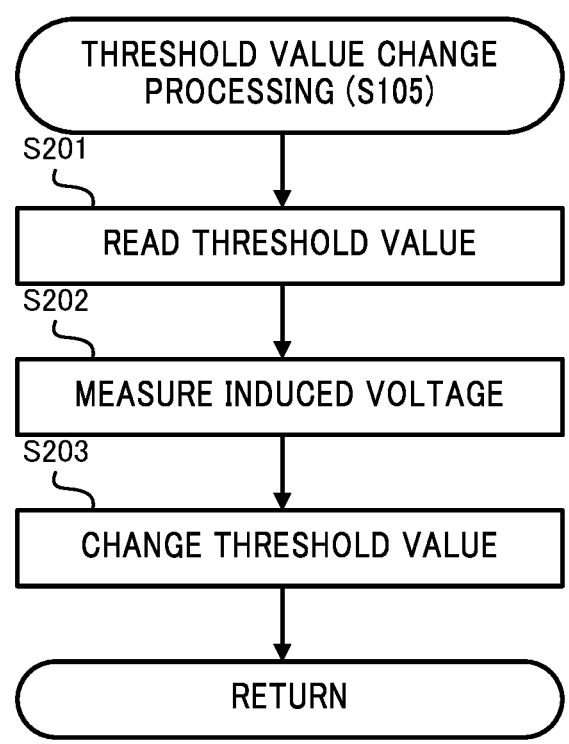
FIG. 12 is a flowchart illustrating threshold value change processing in FIG. 11.

When starting the threshold value change processing illustrated in FIG. 12, the detector 120 reads a threshold value set to the selected sensor coil 111 of threshold values for the sensor coils 111 stored in the storage 122 (Step S201). Then, the detector 120 measures induced voltage induced in the selected sensor coil 111 by the measurer 123 (Step S202).

When measuring induced voltage, the detector 120 changes the threshold value set to the selected sensor coil 111, based on the measured induced voltage (Step S203). Specifically, when the magnitude of the measured induced voltage is relatively large, the detector 120 changes the threshold value set to the selected sensor coil 111 to a relatively small value. Further, when the magnitude of the measured induced voltage is relatively small, the detector 120 changes the threshold value set to the selected sensor coil 111 to a relatively large value. When changing the threshold value, the detector 120 saves the changed threshold value into the storage 122. Thus, the threshold value change processing illustrated in FIG. 12 ends.

Returning to FIG. 11, when executing the threshold value change processing, the detector 120 controls the states of the switches 116 and 117 (Step S106). Specifically, while keeping the switch 117 included in the sensor coil 111 selected in Step S103 in the on-state, the detector 120 changes the state of the switch 116 to the on-state. Thus, a resonant circuit is formed by the coil 114 and the capacitor 115. The detector 120 continues to keep the switches 116 and 117 included in the unselected sensor coils 111 in the off-state.

When controlling the states of the switches 116 and 117, the detector 120 functions as the determiner 134 and executes the determination processing on the selected sensor coil 111 (Step S107). Details of the determination processing will be described with reference to FIG. 13.

Figure 13:
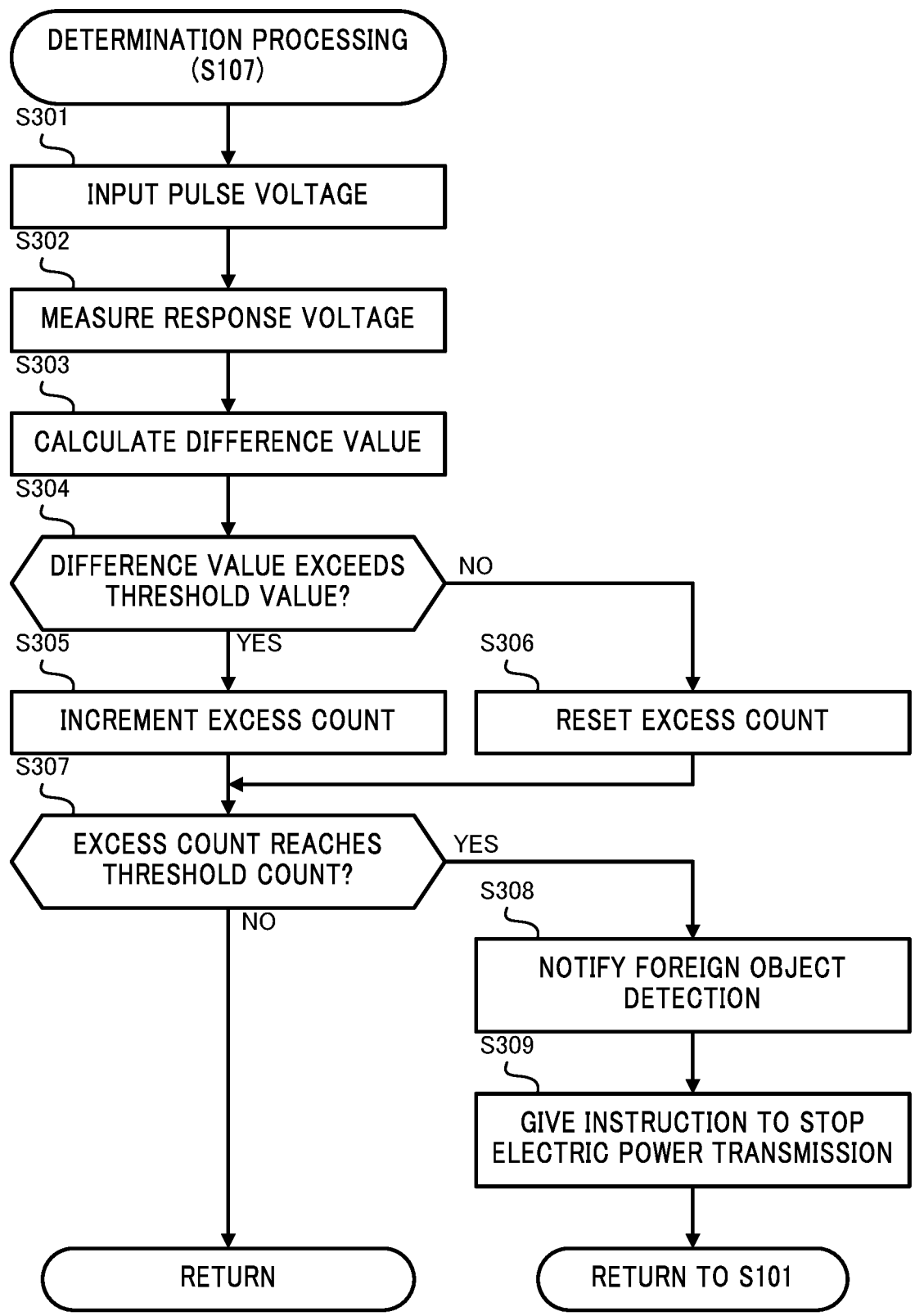
FIG. 13 is a flowchart illustrating determination processing in FIG. 11.

When starting the determination processing illustrated in FIG. 13, the detector 120 inputs pulse voltage to the selected sensor coil 111 (Step S301). Specifically, the detector 120 causes the pulse generator 140 to generate pulse voltage by the driver 133 and inputs the pulse voltage to the selected sensor coil 111 as input voltage.

When inputting the input voltage, the detector 120 measures response voltage output from the selected sensor coil 111 by the measurer 123 (Step S302). Then, the detector 120 calculates a difference value between a value indicating a characteristic of the measured response voltage and a reference value (Step S303).

When calculating the difference value, the detector 120 determines whether the calculated difference value exceeds a threshold value set to the selected sensor coil 111 (Step S304). The threshold value refers to the threshold value changed based on induced voltage induced in the selected sensor coil 111 in the threshold value change processing in Step S105.

When determining that the difference value exceeds the threshold value (Step S304: YES), the detector 120 increments an excess count (Step S305). In other words, the detector 120 increases the excess count by one. When determining that the difference value does not exceed the threshold value (Step S304: NO), the detector 120 resets the excess count (Step S306). In other words, the detector 120 sets the excess count to 0.

When incrementing or resetting the excess count, the detector 120 determines whether the excess count reaches a threshold count (Step S307). When the excess count does not reach the threshold count (Step S307: NO), the detector 120 determines that a foreign object 10 does not exist near the selected sensor coil 111. In this case, the detector 120 skips processing in Steps S308 and 309 and ends the determination processing illustrated in FIG. 13.

On the other hand, when the excess count reaches the threshold count (Step S307: YES), the detector 120 determines that a foreign object 10 exists near the selected sensor coil 111. In this case, the detector 120 functions as the result output device 136 and notifies a user of the foreign object detection through the notifier 150 (Step S308).

When notifying the foreign object detection, the detector 120 functions as the power transmission controller 137 and instructs the electric power supply device 220 to stop electric power transmission (Step S309). Specifically, the detector 120 transmits, to the electric power supply device 220, an instruction to stop supply of AC power to the power transmission coil 211. The processing of giving an instruction to stop electric power transmission in Step S309 may be performed prior to the processing of notifying foreign object detection in Step S308.

When giving the instruction to stop electric power transmission, the detector 120 exits the determination processing illustrated in FIG. 12 and returns to Step S101 in the foreign object detection processing illustrated in FIG. 11. Specifically, the detector 120 exits a loop of the threshold value change processing and the determination processing repeatedly executed on sensor coils 111 and stands by until receiving a start instruction for the foreign object detection processing again.

When determining that the excess count does not reach the threshold count in Step S107 in the foreign object detection processing illustrated in FIG. 11, the detector 120 determines whether an end instruction for the foreign object detection processing is received (Step S108). For example, when electric power is determined to be not being transmitted from the power transmission device 200 to the power reception device 300, based on power transmission information acquired by the power transmission information acquirer 131, the detector 120 determines that an end instruction for the foreign object detection processing is received.

When an end instruction for the foreign object detection processing is not received (Step S108: NO), the detector 120 returns the processing to Step S103. Then, the detector 120 changes a sensor coil 111 selected of the sensor coils 111 and executes the processing in Steps S103 to S108 again. Thus, the detector 120 repeats the processing of determining existence of a foreign object 10 by each of the sensor coils 111 until receiving end processing or detecting a foreign object 10 in Step S105.

On the other hand, when an end instruction for the foreign object detection processing is received (Step S108: YES) or when a start instruction for the foreign object detection processing is not received (Step S101: NO), the detector 120 returns the processing to Step S101. Then, the detector 120 stands by until a start instruction for the foreign object detection processing is received again. When a start instruction for the foreign object detection processing is received again, the detector 120 executes the processing in Steps S101 to S108 again.

As described above, the foreign object detection device 100 and the power transmission device 200 according to Embodiment 1 individually change a threshold value set to each sensor coil 111, based on induced voltage induced in the sensor coil 111, in the device determining existence of a foreign object 10, based on a comparison result between a comparison target value based on response voltage output from each sensor coil 111 in response to input of pulse voltage, and a threshold value. Thus, decline in detection precision caused by difference between magnetic flux densities received by sensor coils 111 can be suppressed, and detection precision of a foreign object 10 can be enhanced.

In particular, when electric power is wirelessly transmitted to the power reception device 300 included in the electric vehicle 700 or the like, the detection target area may be widespread, and a difference between magnetic flux densities depending on the location tends to increase. Even when the detection target area is widespread as described above, the foreign object detection device 100 according to Embodiment 1 can suppress decline in detection precision caused by a difference between magnetic flux densities received by sensor coils 111 by individually changing a threshold value set to each sensor coil 111.

Embodiment 2

Next, Embodiment 2 of the present disclosure will be described. Description of a configuration and processing similar to those according to Embodiment 1 is omitted or simplified.

The changer 135 changes a threshold value set to each of sensor coils 111, according to Embodiment 1. On the other hand, a changer 135 changes a frequency of determination processing executed on each of sensor coils 111 in place of or in addition to changing a threshold value, according to Embodiment 2. Specifically, the changer 135 according to Embodiment 2 changes a frequency of the determination processing executed on each of the sensor coils 111, based on induced voltage induced in each of the sensor coils 111.

Figure 14:
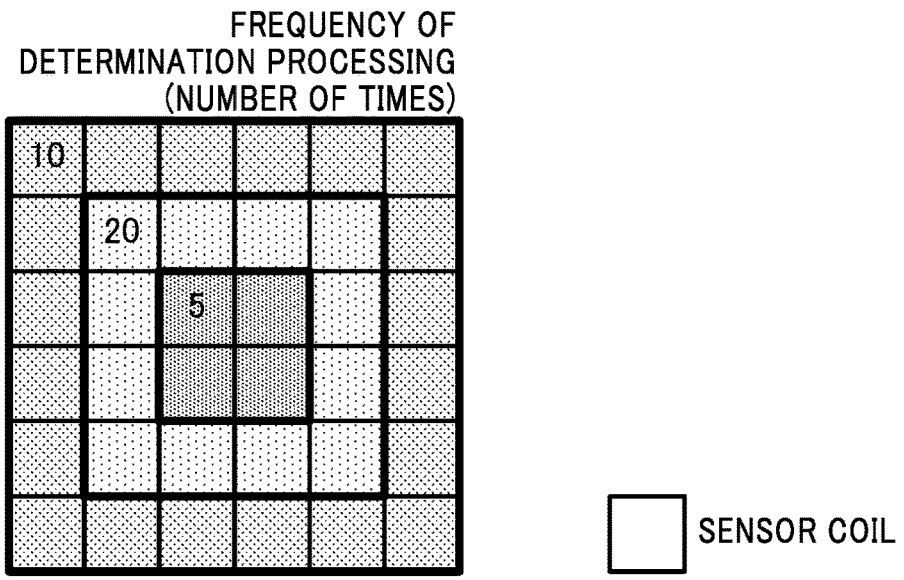
FIG. 14 is a diagram illustrating an example of a frequency of determination processing set to each of sensor coils, according to Embodiment 2.

FIG. 14 illustrates an example of a frequency changed by the changer 135 when induced voltage illustrated in FIG. 8 is induced in each sensor coil 111. A frequency set to each sensor coil 111 corresponds to the number of times determination processing is executed per time span predetermined by a determiner 134. When the frequency of the determination processing is increased, the determination processing is executed at shorter intervals on average; and when the frequency of the determination processing is decreased, the determination processing is executed at longer intervals on average. A frequency of the determination processing is set to an appropriate frequency in an initial setting.

When induced voltage induced in a first sensor coil 111 of the sensor coils 111 is higher than induced voltage induced in a second sensor coil 111 of the sensor coils 111, the changer 135 makes the frequency of the determination processing executed on the first sensor coil 111 higher than the frequency of the determination processing executed on the second sensor coil 111. The first sensor coil 111 and the second sensor coil 111 correspond to two or more sensor coils 111 with varying magnitude of induced voltage of the sensor coils 111 included in a detection coil unit 110, similarly to Embodiment 1.

Specifically, the changer 135 changes the frequency for a sensor coil 111 in a central part where induced voltage is relatively low to a relatively low value being 5, changes the frequency for a sensor coil 111 in an intermediate part where induced voltage is relatively high to a relatively high value being 20, and changes the frequency for a sensor coil 111 in an outer part where the magnitude of induced voltage is moderate to a moderate value being 10, as illustrated in FIG. 14. In other words, the changer 135 changes the frequency of the determination processing executed on a sensor coil 111 with a relatively high induced voltage of the sensor coils 111 to a relatively high value and changes the frequency of the determination processing executed on a sensor coil 111 with a relatively low induced voltage to a relatively low value.

Figure 15:
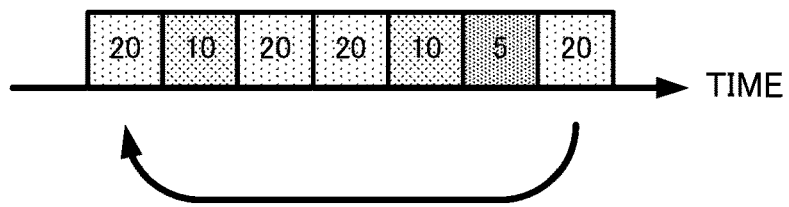
FIG. 15 is a diagram illustrating an example of an execution order of determination processing executed at the frequencies illustrated in FIG. 14.

After the frequencies are changed by the changer 135, a selector 132 selects sensor coils 111 being targets of the determination processing of the sensor coils 111 included in the detection coil unit 110 at the frequencies changed by the changer 135. Specifically, the selector 132 repeats a cycle of selecting sensor coils 111 in an order of the intermediate part, the outer part, the intermediate part, the intermediate part, the outer part, the central part, the intermediate part, . . . , as illustrated in FIG. 15. In other words, the selector 132 makes the number of times sensor coils 111 in the intermediate part to which a relatively high frequency is set are selected largest and the number of times sensor coils 111 in the central part to which a relatively low frequency is set are selected smallest.

When a sensor coil 111 is selected by the selector 132, the determiner 134 executes the determination processing of determining existence of a foreign object 10 near the selected sensor coil 111, based on response voltage to pulse voltage input to the sensor coil 111. Thus, a sensor coil 111 placed at a location where magnetic flux density is relatively high is selected at a high frequency, and therefore a foreign object detection device 100 according to Embodiment 2 can more promptly and more reliably detect a foreign object 10 existing at a location where magnetic flux density is relatively high.

Embodiment 3

Next, Embodiment 3 of the present disclosure will be described. Description of a configuration and processing similar to those according to Embodiments 1 and 2 is omitted or simplified.

The changer 135 changes a threshold value set to each of sensor coils 111, according to Embodiment 1. On the other hand, a changer 135 changes ordinal numbers for determination processing executed on sensor coils 111 in place of or in addition to changing a threshold value, according to Embodiment 3. Specifically, the changer 135 according to Embodiment 3 changes ordinal numbers for the determination processing executed on the sensor coils 111, based on induced voltage induced in each of the sensor coils 111.

Figure 16:
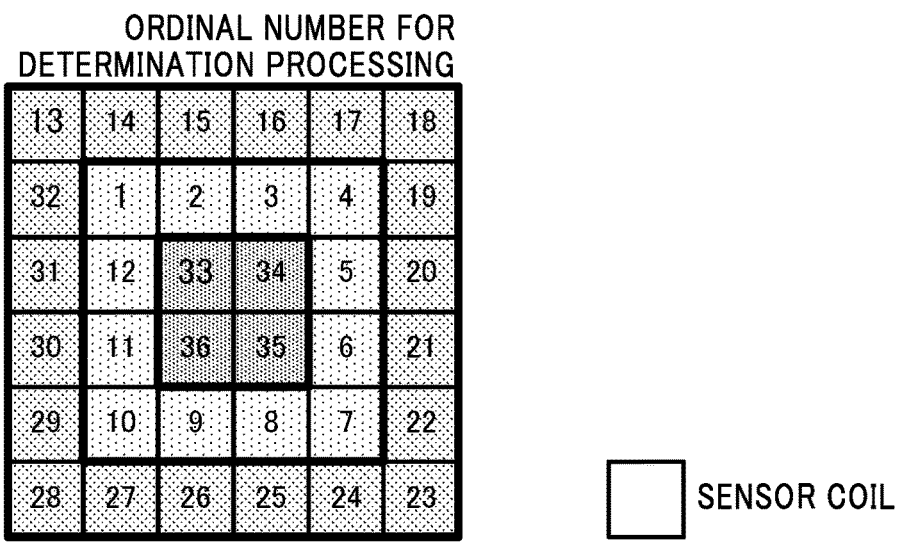
FIG. 16 is a diagram illustrating an example of an ordinal number for determination processing set to each of sensor coils, according to Embodiment 3.

FIG. 16 illustrates an example of ordinal numbers changed by the changer 135 when the induced voltage illustrated in FIG. 8 is induced in each sensor coil 111. Numbers 1 to 36 indicated at the sensor coils 111 in FIG. 16 represent ordinal numbers for the determination processing executed by the determiner 134. Ordinal numbers for the determination processing are set to appropriate ordinal numbers in an initial setting.

When induced voltage induced in a first sensor coil 111 of the sensor coils 111 is higher than induced voltage induced in a second sensor coil 111 of the sensor coils 111, the changer 135 makes an ordinal number for the determination processing executed on the first sensor coil 111 lower than an ordinal number for the determination processing executed on the second sensor coil 111. The first sensor coil 111 and the second sensor coil 111 correspond to two or more sensor coils 111 with varying magnitude of induced voltage of the sensor coils 111 included in the detection coil unit 110, similarly to Embodiments 1 and 2.

Specifically, the changer 135 sets ordinal numbers of sensor coils 111 in a central part where induced voltage is relatively low to relatively high ordinal numbers of 33rd to 36th, changes ordinal numbers of sensor coils 111 in an intermediate part where induced voltage is relatively high to relatively low ordinal numbers of first to 12th, and changes ordinal numbers of sensor coils 111 in an outer part where the magnitude of induced voltage is moderate to moderate ordinal numbers of 13th to 32nd, as illustrated in FIG. 16. In other words, the changer 135 changes an ordinal number for the determination processing executed on a sensor coil 111 in which induced voltage is relatively high of the sensor coils 111 to a relatively low ordinal number and changes an ordinal number for the determination processing executed on a sensor coil 111 in which induced voltage is relatively low to a relatively high ordinal number.

After ordinal numbers are changed by the changer 135, the selector 132 selects a sensor coil 111 being a target of the determination processing of the sensor coils 111 included in the detection coil unit 110, based on the ordinal numbers changed by the changer 135. Specifically, the selector 132 selects a sensor coil 111 placed at a location where magnetic flux density is relatively high at an ordinal number lower than that for a sensor coil 111 placed at a location where magnetic flux density is relatively low.

When a sensor coil 111 is selected by the selector 132, the determiner 134 executes the determination processing of determining existence of a foreign object 10 near the selected sensor coil 111, based on response voltage to pulse voltage input to the sensor coil 111. Thus, a sensor coil 111 placed at a location where magnetic flux density is relatively high is preferentially selected, and therefore a foreign object detection device 100 according to Embodiment 3 can more promptly and more reliably detect a foreign object 10 existing at a location where magnetic flux density is relatively high.

Embodiment 4

Next, Embodiment 4 of the present disclosure will be described. Description of a configuration and processing similar to those according to Embodiments 1 to 3 is omitted or simplified.

The foreign object detection device 100 detects a foreign object 10 existing in the detection target area, according to Embodiment 1. On the other hand, a foreign object detection device 100 detects an abnormality other than a foreign object 10 in a power transmission device 200 in addition to detecting a foreign object 10, according to Embodiment 4.

A determiner 134 according to Embodiment 4 determines whether induced voltage induced in any of sensor coils 111 included in a detection coil unit 110 is abnormal. An abnormality determined by the determiner 134 is an abnormality based on a phenomenon different from existence of a foreign object 10, such as generation of overcurrent or a failure of a sensor coil 111.

The determiner 134 measures, by a measurer 123, induced voltage induced in a sensor coil 111 selected by a selector 132 when electric power is transmitted from the power transmission device 200 to a power reception device 300 and pulse voltage is not input from a pulse generator 140. Then, when the magnitude of the induced voltage measured by the measurer 123 is greater than a predetermined upper limit, the determiner 134 determines that the induced voltage is abnormal. For example, the above corresponds to a case that an abnormally high induced voltage is induced due to overcurrent. The upper limit is preset to a maximum value of the magnitude of induced voltage assumed under normal operation.

Further, the determiner 134 also determines that induced voltage is abnormal when the magnitude of the induced voltage is less than a predetermined lower limit. The above corresponds to a case that induced voltage is not output from a sensor coil 111 selected by the selector 132 or an output value of the induced voltage is excessively small, such as a case of a failure of the sensor coil 111. The lower limit includes 0 and is preset to a minimum value of the magnitude of induced voltage assumed under normal operation.

When induced voltage is determined to be abnormal by the determiner 134, a result output device 136 instructs a notifier 150 to notify the abnormality. When receiving the notification from the determiner 134, the notifier 150 transmits information indicating occurrence of the abnormality to a terminal device 600 carried by a user. When receiving the information, the terminal device 600 informs the occurrence of the abnormality to the user by a screen display, a voice output, or the like.

When induced voltage is determined to be abnormal by the determiner 134, a power transmission controller 137 causes an electric power supply device 220 to restrict supply of AC power to a power transmission coil 211. For example, the power transmission controller 137 instructs the electric power supply device 220 to stop supply of AC power to the power transmission coil 211. When receiving the instruction to stop supply of AC power, the electric power supply device 220 stops supply of AC power to the power transmission coil 211. Thus, electric power transmission by the power transmission device 200 stops.

Threshold value change processing in Embodiment 4 will be described with reference to FIG. 17. The foreign object detection device 100 according to Embodiment 4 executes threshold value change processing illustrated in FIG. 17 in place of the threshold value change processing illustrated in FIG. 12 in Embodiment 1. Note that processing other than the threshold value change processing in Embodiment 4 is similar to the processing illustrated in FIG. 11 and FIG. 13 in Embodiment 1, and therefore description thereof is omitted.

Figure 17:
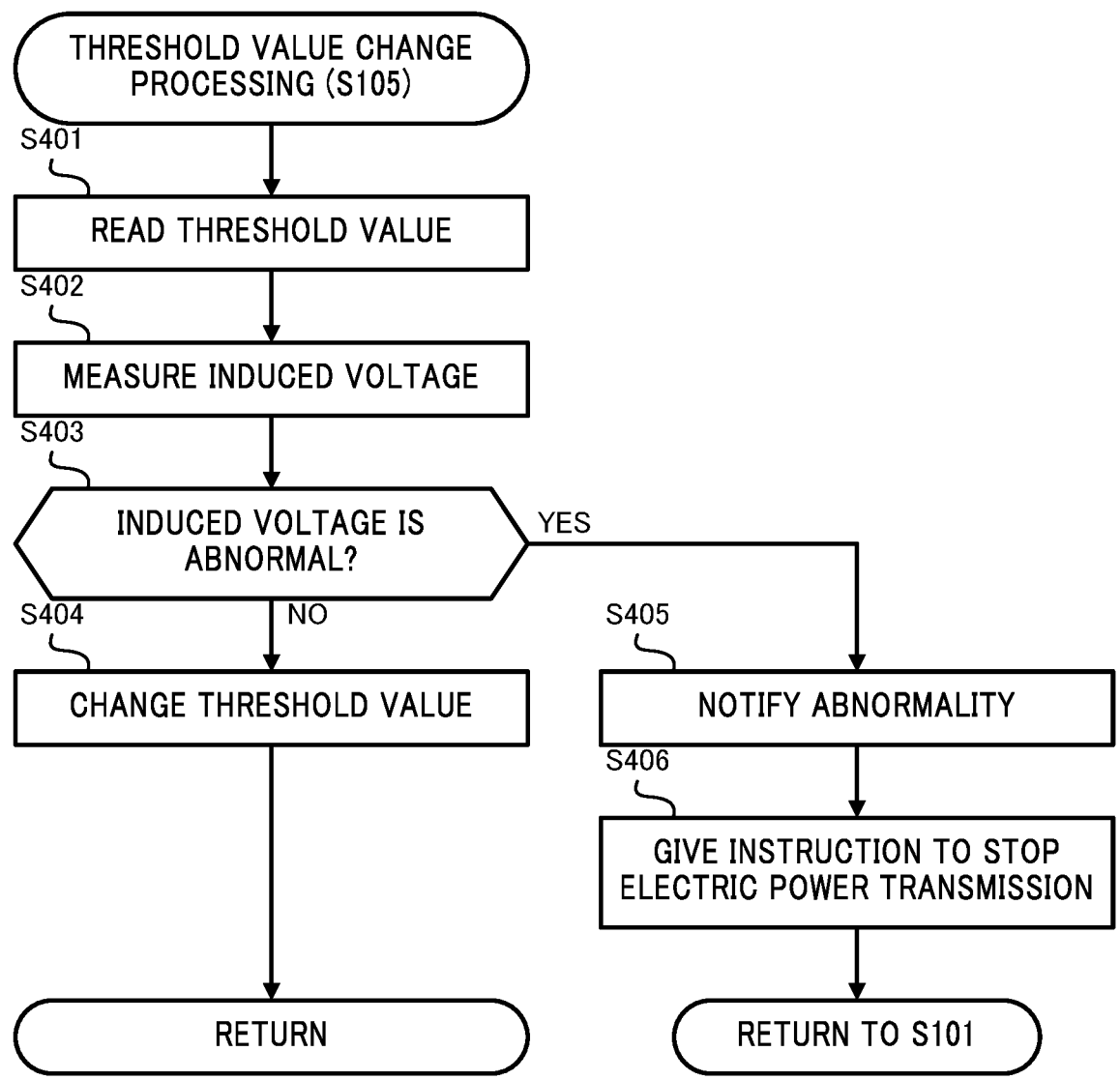
FIG. 17 is a flowchart illustrating threshold value change processing according to Embodiment 4.

When starting the threshold value change processing illustrated in FIG. 17, a detector 120 reads a threshold value set to a selected sensor coil 111 of threshold values for the sensor coils 111 stored in a storage 122 (Step S401). Then, the detector 120 measures induced voltage induced in the selected sensor coil 111 by the measurer 123 (Step S402).

When measuring induced voltage, the detector 120 determines whether the induced voltage is abnormal (Step S403). For example, the detector 120 determines that the induced voltage is abnormal when the magnitude of the induced voltage is greater than a predetermined upper limit or less than a predetermined lower limit.

When the induced voltage is abnormal (Step S403: YES), the detector 120 functions as the result output device 136 and notifies a user of the abnormality through the notifier 150 (Step S404).

When notifying the abnormality, the detector 120 functions as the power transmission controller 137 and instructs the electric power supply device 220 to stop electric power transmission (Step S405). Specifically, the detector 120 transmits, to the electric power supply device 220, an instruction to stop supply of AC power to the power transmission coil 211. The processing of giving an instruction to stop electric power transmission in Step S405 may be performed prior to the processing of notifying foreign object detection in Step S404.

When giving the instruction to stop electric power transmission, the detector 120 exits the threshold value change processing illustrated in FIG. 17 and returns to Step S101 in the foreign object detection processing illustrated in FIG. 11. Specifically, the detector 120 exits a loop of the threshold value change processing and determination processing repeatedly executed on the sensor coils 111 and stands by until receiving a start instruction of the foreign object detection processing again.

On the other hand, when the induced voltage is not abnormal (Step S403: NO), the detector 120 executes processing similar to Step S203 and beyond in Embodiment 1. Specifically, the detector 120 changes the threshold value set to the selected sensor coil 111, based on the measured induced voltage (Step S404). When changing the threshold value, the detector 120 saves the changed threshold value into the storage 122. Thus, the threshold value change processing illustrated in FIG. 17 ends.

As described above, the foreign object detection device 100 according to Embodiment 4 detects a foreign object 10, based on induced voltage induced in each sensor coil 111 by alternating magnetic flux Φ and further detects an abnormality other than a foreign object 10 in the power transmission device 200. The induced voltage used for detection of a foreign object 10 is also used for detection of an abnormality other than a foreign object 10, and therefore a new configuration does not need to be added. Therefore, an abnormality occurring in the power transmission device 200 can be detected with a simple configuration.

Furthermore, the foreign object detection device 100 according to Embodiment 4 uses induced voltage and therefore can detect an abnormality on the power transmission device 200 side rather than on the power reception device 300 side. Assuming that a state abnormality is detected in the power reception device 300, it takes time for the power reception device 300 to notify the power transmission device 200 of an abnormality after detecting the abnormality. For example, when instructing, from the power reception device 300, the power transmission device 200 to stop power feed by using periodic communication such as wireless fidelity (Wi-Fi) in a case of occurrence of output overvoltage, it takes several tens of milliseconds. On the other hand, Embodiment 4 enables the detector 120 to directly instruct the electric power supply device 220 to stop power feed through a signal line. Therefore, power feed can be far more rapidly stopped compared with periodic communication such as Wi-Fi.

Embodiment 5

Next, Embodiment 5 of the present disclosure will be described. Description of a configuration and processing similar to those according to Embodiments 1 to 4 is omitted or simplified.

The determiner 134 determines whether a foreign object 10 exists near a sensor coil 111, based on response voltage output from the sensor coil 111 as a response to pulse voltage input from the pulse generator 140, according to Embodiments 1 to 4. In other words, the determiner 134 determines existence of a foreign object 10 by a self-excitation method. On the other hand, a determiner 134 determines existence of a foreign object 10 by a separate excitation method, according to Embodiment 5.

Specifically, the determiner 134 determines whether a foreign object 10 exists near a sensor coil 111, based on induced voltage induced in the sensor coil 111 by magnetic flux generated by a power transmission coil 211. In other words, output voltage used for determining existence of a foreign object 10 is induced voltage induced in a sensor coil 111 by alternating magnetic flux Φ generated by the power transmission coil 211 rather than response voltage output from the sensor coil 111 as a response to pulse voltage, according to Embodiment 5.

In other words, induced voltage is used in both determination processing executed by the determiner 134 and threshold value change processing executed by a changer 135, according to Embodiment 5. Existence of a foreign object 10 is highly likely to change on a relatively short time scale. Therefore, the determiner 134 determines existence of a foreign object 10 according to a minute change in induced voltage in a relatively short period. On the other hand, density of alternating magnetic flux Φ for determining a threshold value depends on a state, an installation environment, and the like of a power transmission device 200 and therefore is less likely to change on a short time scale. Therefore, the changer 135 changes a threshold value according to a dynamic change in induced voltage in a relatively long period. Thus, induced voltages induced in different time periods are used in the determination processing and the threshold value change processing, respectively, according to Embodiment 5.

More specifically, in the determination processing, the determiner 134 determines existence of a foreign object 10, based on a comparison result between a comparison target value based on induced voltage output from a sensor coil 111 in a first period and a threshold value set to the sensor coil 111. The first period is a period with a predetermined length in the past relative to the present moment and, for example, is a period with a length of roughly several minutes to several hours. The determiner 134 determines whether a foreign object 10 exists near a sensor coil 111, based on the mean value of magnitudes of induced voltage induced in the sensor coil 111 in the first period.

In the threshold value change processing, the changer 135 changes a threshold value set to a sensor coil 111, based on induced voltage induced in the sensor coil 111 by alternating magnetic flux Φ in a second period longer than the first period. The second period is a period with a predetermined length in the past relative to the present moment and, for example, is a period with a length of roughly several hours to several days. The changer 135 changes a threshold value set to a sensor coil 111, based on the mean value of magnitudes of induced voltage induced in the sensor coil 111 in the second period.

The other items in Embodiment 5 can be similarly described by replacing "response voltage" and "induced voltage" in Embodiment 1 with "induced voltage in the first period" and "induced voltage in the second period," respectively. Note that, in the case of the self-excitation method in Embodiment 1, the resonance frequency of a resonant circuit formed by the coil 114 and the capacitor 115 is designed to be several MHz. Therefore, the measurer 123 measures a voltage value between both ends of the coil 114 as induced voltage in a state of the switch 116 being turned off, according to Embodiment 1. On the other hand, in the case of the separate excitation method in Embodiment 5, the resonance frequency is designed to be about 85 kHz. Therefore, a measurer 123 measures a voltage value between both ends of a resonant circuit as induced voltage in a state of a switch 116 being turned on, according to Embodiment 5.

Specifically, in Step S104 in the foreign object detection processing illustrated in FIG. 11, a detector 120 controls switches 116 and 117 in each sensor coil 111 included in a detection coil unit 110 in such a way that both switches 116 and 117 included in a sensor coil 111 selected in Step S103 are in an on-state, and all switches 116 and 117 included in unselected sensor coils 111 are in an off-state. The detector 120 executes the threshold value change processing in Step S105 and the determination processing in Step S107 in such a state of a resonant circuit being formed in the selected sensor coil 111. The switch control processing in Step S106 is omitted.

Further, pulse voltage is not used in Embodiment 5, and therefore the foreign object detection device 100 may not include a pulse generator 140. The processing in Step S301 in the determination processing illustrated in FIG. 13 is omitted.

Thus, even when the separate excitation method is used, existence of a foreign object 10 can be determined based on output voltage output from each sensor coil 111. Then, by changing a threshold value set to each sensor coil 111, based on induced voltage, an effect of enhancing detection precision of a foreign object 10 can be acquired, similarly to Embodiments 1 to 4.

Modified Examples

While the embodiments of the present disclosure have been described above, modifications and applications in various forms can be made in implementation of the present disclosure. In the present disclosure, any part of the configurations, functions, and operations described in the aforementioned embodiments can be employed. Further, in the present disclosure, more configurations, functions, and operations may be employed in addition to the aforementioned configurations, functions, and operations. Further, the aforementioned embodiments can be combined in any way as appropriate. Further, the number of components described in the aforementioned embodiments may be adjusted as appropriate. Further, it is apparent that materials, sizes, electric characteristics, and the like employable in the present disclosure are not limited to those described in the aforementioned embodiments.

An example of a comparison target value compared with a threshold value being a difference value between a value indicating a characteristic of response voltage output from a sensor coil 111 and a reference value has been described in the aforementioned embodiments. However, a comparison target value may not be a difference value itself as long as the comparison target value is a value based on a difference value. For example, a comparison target value may be a value calculated by performing a predetermined operation on a difference value or may be a value determined from a difference value with reference to a predetermined table.

The determiner 134 determines that a foreign object 10 exists when an excess count of a comparison target value exceeding a threshold value reaches a threshold count, according to the aforementioned embodiments. However, the determiner 134 may determine that a foreign object 10 exists when a comparison target value exceeds the threshold value only once. Alternatively, threshold values may be set and the determiner 134 may determine existence of a foreign object 10, based on an excess count of a comparison target value exceeding each of the threshold values. When threshold values are set, the changer 135 may execute the aforementioned threshold value change processing on each of the threshold values or may execute the aforementioned threshold value change processing on part of the threshold values.

The measurer 123 measures induced voltage output from a sensor coil 111, according to the aforementioned embodiments. Then, the changer 135 executes the threshold value change processing, based on the induced voltage measured by the measurer 123. However, the measurer 123 may include a circuit for current measurement and measure induced current output from a sensor coil 111. Then, the changer 135 may execute the threshold value change processing, based on the induced current measured by the measurer 123.

Detection of a foreign object 10 is notified to a user of a terminal device 600 by transmitting information indicating the detection of the foreign object 10 to the terminal device 600 by the notifier 150, according to the aforementioned embodiments. However, a method of notifying a user of detection of a foreign object 10 is not limited to the above. For example, the notifier 150 may directly notify a user of detection of a foreign object 10 by a screen display, a voice output, or the like.

In the controller 121, the CPU functions as components being the power transmission information acquirer 131, the selector 132, the driver 133, the determiner 134, the changer 135, the result output device 136, and the power transmission controller 137 by executing a program stored in the ROM or the storage 122, according to the aforementioned embodiments. However, the controller 121 may include dedicated hardware such as an application specific integrated circuit (ASIC), a field-programmable gate array (FPGA), or various control circuits in place of the CPU, and the dedicated hardware may function as the components. In this case, the function of each component may be provided by individual piece of hardware, or the functions of the components may be collectively provided by a single piece of hardware. Further, part of the functions of the components may be provided by dedicated hardware and the other part may be provided by software or firmware.

While several embodiments of the present disclosure have been described, the embodiments are presented as examples and do not intend to limit the scope of the invention. The new embodiments may be implemented in various other forms, and various omissions, substitutions, and changes may be made without departing from the spirit of the invention. The embodiments and modifications thereof are included in the scope and spirit of the invention and are also included in the invention described in the claims and equivalents thereof.

REFERENCE SIGNS LIST

10 Foreign object
100 Foreign object detection device
110 Detection coil unit
111, 111A, 111B, 111C, 111D, 111E, 111F, 111G, 111H, 111I, 111J, 111K, 111L Sensor coil
112 External connection connector
113 Detection coil substrate
114 Coil
115 Capacitor
116, 117 Switch
118 First connection wiring
119 Second connection wiring
120 Detector
121 Controller
122 Storage
123 Measurer
131 Power transmission information acquirer
132 Selector
133 Driver
134 Determiner
135 Changer
136 Result output device
137 Power transmission controller
140 Pulse generator
150 Notifier
200 Power transmission device
210 Power transmission coil unit
211 Power transmission coil
212 Magnetic body plate
220 Electric power supply device
300 Power reception device
310 Power reception coil unit
311 Power reception coil
312 Magnetic body plate
320 Rectifier circuit
400 Commercial power source
500 Storage battery
600 Terminal device
700 Electric vehicle
1000 Electric power transmission system

The invention claimed is:

1. A power transmission device that wirelessly transmits electric power to a power reception device, the power transmission device comprising:
a power transmission coil configured by winding a conductive wire; and
a foreign object detection device detecting a foreign object, wherein
the foreign object detection device includes:
sensor coils placed to cover the power transmission coil; and
a detector executing determination processing of determining existence of the foreign object on each of the sensor coils, based on a comparison result between a comparison target value based on output voltage output from one sensor coil of the sensor coils and a threshold value set to the one sensor coil, and
the detector executes threshold value change processing of changing the threshold value set to the one sensor coil on each of the sensor coils, based on induced voltage induced in the one sensor coil by magnetic flux generated by the power transmission coil.

2. The power transmission device according to claim 1, wherein, when the induced voltage induced in a first sensor coil of the sensor coils is higher than the induced voltage induced in a second sensor coil of the sensor coils, the detector makes the threshold value set to the first sensor coil smaller than the threshold value set to the second sensor coil.

3. The power transmission device according to claim 1, wherein the detector changes a frequency of the determination processing executed on each of the sensor coils, based on the induced voltage induced on each of the sensor coils.

4. The power transmission device according to claim 3, wherein, when the induced voltage induced in a first sensor coil of the sensor coils is higher than the induced voltage induced in a second sensor coil of the sensor coils, the detector makes a frequency of the determination processing executed on the first sensor coil higher than a frequency of the determination processing executed on the second sensor coil.

5. The power transmission device according to claim 1, wherein the detector changes an ordinal number for the determination processing executed on each of the sensor coils, based on the induced voltage induced in each of the sensor coils.

6. The power transmission device according to claim 3, wherein, when the induced voltage induced in a first sensor coil of the sensor coils is higher than the induced voltage induced in a second sensor coil of the sensor coils, the detector makes an ordinal number for the determination processing executed on the first sensor coil lower than an ordinal number for the determination processing executed on the second sensor coil.

7. The power transmission device according to claim 1, wherein
the power transmission device further includes an electric power supply device supplying AC power to the power transmission coil, and,
when the induced voltage is abnormal, the detector causes the electric power supply device to restrict supply of the AC power to the power transmission coil.

8. The power transmission device according to claim 7, wherein, when magnitude of the induced voltage is greater than a predetermined upper limit or less than a predetermined lower limit, the detector determines that the induced voltage is abnormal.

9. The power transmission device according to claim 1, wherein the output voltage is response voltage output from the one sensor coil as a response to input voltage input to the one sensor coil.

10. The power transmission device according to claim 1, wherein the output voltage is induced voltage induced in the one sensor coil by the magnetic flux in a first period, and the detector changes the threshold value set to the one sensor coil, based on induced voltage induced in the one sensor coil by the magnetic flux in a second period longer than the first period in the threshold value change processing.

11. An electric power transmission system, comprising:

the power transmission device according to claim 1; and the power reception device.

\* \* \* \* \*